United States Patent
da Silva

(10) Patent No.: US 11,330,453 B2
(45) Date of Patent: May 10, 2022

(54) PERFORMING CELL MEASUREMENTS

(71) Applicant: Telefonaktiebolaget LM Ericsson (publ), Stockholm (SE)

(72) Inventor: Icaro L. J. da Silva, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 76 days.

(21) Appl. No.: 16/343,154

(22) PCT Filed: Mar. 7, 2019

(86) PCT No.: PCT/SE2019/050201
§ 371 (c)(1),
(2) Date: Apr. 18, 2019

(87) PCT Pub. No.: WO2019/194716
PCT Pub. Date: Oct. 10, 2019

(65) Prior Publication Data
US 2020/0120521 A1    Apr. 16, 2020

Related U.S. Application Data

(60) Provisional application No. 62/652,505, filed on Apr. 4, 2018.

(51) Int. Cl.
*H04W 24/08*    (2009.01)
*H04B 7/06*    (2006.01)
(Continued)

(52) U.S. Cl.
CPC .......... *H04W 24/08* (2013.01); *H04B 7/0632* (2013.01); *H04L 5/0048* (2013.01);
(Continued)

(58) Field of Classification Search
None
See application file for complete search history.

(56) References Cited

U.S. PATENT DOCUMENTS 9,398,501 B1 * 7/2016 Liu ................... H04W 36/0085
2011/0098042 A1 * 4/2011 Mach ................... H04W 48/20
455/435.1
(Continued)

FOREIGN PATENT DOCUMENTS

EP    3264630 A1    1/2018

OTHER PUBLICATIONS

3GPP, "3rd Generation Partnership Project; Technical Specification Group Radio Access Network; NR; NR and NG-RAN Overall Description; Stage 2 (Release 15)", 3GPP TS 38.300 V15.0 0, Dec. 2017, pp. 1-68.
(Continued)

*Primary Examiner* — Faruk Hamza
*Assistant Examiner* — Cassandra L Decker
(74) *Attorney, Agent, or Firm* — Sage Patent Group

(57) ABSTRACT

Embodiments described herein relate to methods and apparatus for performing cell measurements. A method in a wireless device comprises receiving a first control message from a base station instructing the wireless device to transition from a first mode of operation to a second mode of operation; and responsive to the control message comprising
(Continued)

information relating to at least one first cell measurement parameter, performing a cell measurement according to the at least one first cell measurement parameter.

17 Claims, 12 Drawing Sheets

(51) Int. Cl.
*H04W 48/16* (2009.01)
*H04L 5/00* (2006.01)
*H04W 24/02* (2009.01)
*H04W 48/20* (2009.01)
*H04W 76/30* (2018.01)

(52) U.S. Cl.
CPC .......... *H04W 48/16* (2013.01); *H04L 5/0023* (2013.01); *H04L 5/0057* (2013.01); *H04L 5/0091* (2013.01); *H04W 24/02* (2013.01); *H04W 48/20* (2013.01); *H04W 76/30* (2018.02)

(56) References Cited

U.S. PATENT DOCUMENTS

| | | | |
|---|---|---|---|
| 2013/0090115 A1* | 4/2013 | Deivasigamani ..... | H04W 48/20 455/434 |
| 2013/0242773 A1* | 9/2013 | Wernersson .......... | H04B 7/024 370/252 |
| 2014/0050115 A1* | 2/2014 | Takahashi ............. | H04W 24/08 370/252 |
| 2014/0362716 A1* | 12/2014 | Zhang ................... | H04W 24/10 370/252 |
| 2015/0099517 A1* | 4/2015 | Wang .................... | H04W 48/16 455/436 |
| 2016/0095008 A1* | 3/2016 | Zhao ..................... | H04W 24/08 370/252 |
| 2017/0359759 A1* | 12/2017 | Brown .................. | H04W 48/12 |
| 2018/0198585 A1* | 7/2018 | Lin ........................ | H04B 7/024 |
| 2018/0270682 A1* | 9/2018 | Zacharias ......... | H04W 74/0833 |
| 2019/0037425 A1* | 1/2019 | Hong ................. | H04W 72/042 |
| 2019/0289552 A1* | 9/2019 | Jain ...................... | H04B 7/0632 |
| 2019/0306739 A1* | 10/2019 | Kim ...................... | H04L 5/0096 |
| 2019/0363809 A1* | 11/2019 | Yoon .................... | H04W 24/10 |
| 2020/0137604 A1* | 4/2020 | Chen .................... | H04W 48/20 |
| 2020/0154327 A1* | 5/2020 | Koskela ............... | H04B 7/0617 |
| 2020/0178107 A1* | 6/2020 | Miao .................... | H04W 76/27 |
| 2020/0267583 A1* | 8/2020 | Cheng .................. | H04W 48/16 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.0.1, Jan. 2018, pp. 1-776.

3GPP, "3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304 V14.6.0, Mar. 2018, pp. 1-50.

Unknown, Author, "Faster release with redirection for CDMA2000", 3GPP TSG RAN WG2 #66bis, R2-093767, Los Angeles, USA, Jun. 29-Jul. 3, 2009, pp. 1-4.

Unknown, Author, "RRM Measurement in NR: The Details of Cell Quality Derivation", 3GPP TSG RAN WG2 #97bis, R2-1703722, Spokane, USA, Apr. 3-7, 2017, pp. 1-5.

Unknown, Author, "RRM Measurement in NR: The Details of Filtering", 3GPP TSG RAN WG2 #97bis, R2-1703721, Spokane, USA, Apr. 3-7, 2017, pp. 1-6.

3GPP, "3rd Generation Partnership Project; Technical Specification Group Radio Access Network; Evolved Universal Terrestrial Radio Access (E-UTRA); User Equipment (UE) procedures in idle mode (Release 14)", 3GPP TS 36.304 V14.5.0, Dec. 2017, 1-49.

3GPP, "3rd Generation Partnership Project; Technical Specification Group Radio Access Network; Mobile radio interface layer 3 specification; GSM/EDGE Radio Resource Control (RRC) protocol (Release 15)", 3GPP TS 44.018 V15.1.0, Dec. 2017, 1-560.

3GPP, "3rd Generation Partnership Project; Technical Specification Group Radio Access Network; NR; Physical channels and modulation (Release 15)", 3GPP TS 38.211 V15.0.0, Dec. 2017, 1-73.

3GPP, "3rd Generation Partnership Project; Technical Specification Group Radio Access Network; NR; Physical layer measurements (Release 15)", 3GPP TS 38.215 V15.0.0, Dec. 2017, 1-13.

3GPP, "3rd Generation Partnership Project; Technical Specification Group Radio Access Network; NR; Physical layer procedures for control (Release 15)", 3GPP TS 38.213 V15.0.0, Dec. 2017, 1-56.

3GPP, "3rd Generation Partnership Project; Technical Specification Group Radio Access Network; NR; User Equipment (UE) procedures in Idle mode and RRC Inactive state (Release 15) 3GPP TS 38.304 v1.0.0 (Mar. 2018)", 3GPP TS 38.304 v1.0.0, Mar. 2018, 1-21.

3GPP, "3rd Generation Partnership Project; Technical Specification Group Radio Access Network; Radio Resource Control (RRC); Protocol specification (Release 15)", 3GPP TS 25.331 V15.1.0, Dec. 2017, 1-2316.

* cited by examiner

1102
Transmit a first control message to the wireless device instructing the wireless device to transition from a first mode of operation to a second mode of operation, wherein the control message comprises information relating to at least one first cell measurement parameter for use by the wireless device in performing cell measurements whilst in the second mode of operation

Fig. 11

PERFORMING CELL MEASUREMENTS

TECHNICAL FIELD

Embodiments described herein relate to methods and apparatus for performing a cell measurement.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In LTE, a wireless device may operate in at least two modes of operation. A first mode of operation may be referred to as RRC_CONNECTED and a second mode of operation may be referred to as RRC_IDLE. The first mode of operation, RRC_CONNECTION, is optimized for uplink and downlink data transmission and the second mode of operation, RRC_IDLE is optimized to minimize power consumption of the wireless device.

A wireless device may enter RRC_IDLE in response to receiving an RRCConnetionRelease message from the network. The RRCConnectionRelease message may contain an information element called idleMobilityControlInfo. The information element idleMobilityControlInfo may provide dedicated cell reselection priorities to be used for cell reselection, as specified in Specification TS 36.304.

An example of the RCCConnectionRelease is shown below in Appendix 1. Table 1 describes the different fields in the message RRCConnectionRelease.

TABLE 1

A description of the fields in an RRCConnection Release message
RRCConnectionRelease field descriptions

| |
| --- |
| carrierFreq or bandClass |
| The carrier frequency (universal terrestrial radio access (UTRA) and evolved universal terrestrial radio access(E-UTRA)) and band class (high rate packet data (HRPD) and 1xRadio transmission technology (1xRTT)) for which the associated cellReselectionPriority is applied, |
| carrierFreqs |
| The list of Global System for Mobile communications (GSM) Enhanced Data rates for GSM Evolution Radio Access Network (GERAN) carrier frequencies organised into one group of GERAN carrier frequencies. |
| cellInfoList |
| Used to provide system information of one or more cells on the redirected inter-radio access technology (RAT) carrier frequency. The system information can be used if, upon redirection, the wireless device selects an inter-RAT cell indicated by the physCellId and carrierFreq (GERAN and UTRA TDD) or by the physCellId (other RATs). The choice shall match the redirectedCarrierInfo. In particular, E-UTRAN only applies value utra-TDD-r10 in case redirectedCarrierInfo is set to utra-TDD-r10. |
| extendedWaitTime |
| Value in seconds for the wait time for Delay Tolerant access requests. |
| freqPriorityListX |
| Provides a cell reselection priority for each frequency, by means of separate lists for each RAT (including E-UTRA). The wireless device shall be able to store at least 3 occurrences of FreqsPriorityGERAN. If E-UTRAN includes freqPriorityListEUTRA-v9e0 and/or freqPriorityListEUTRA-v1310 it includes the same number of entries, and listed in the same order, as in freqPriorityListEUTRA (i.e. without suffix). Field freqPriorityListExt includes additional neighbouring inter-frequencies, i.e. extending the size of the inter-frequency carrier list using the general principles specified above, EUTRAN only includes freqPriorityListExtEUTRA if freqPriorityListEUTRA (i.e without suffix) includes maxFreq entries. If E-UTRAN includes freqPriorityListExtEUTRA-v1310 it includes the same number of entries, and listed in the same order, as in freqPriorityListExtEUTRA-r12. |
| idleModeMobilityControlInfo |
| Provides dedicated cell reselection priorities. Used for cell reselection as specified in TS 36.304. For E-UTRA and UTRA frequencies, a wireless device that supports multi-band cells for the concerned RAT considers the dedicated priorities to be common for all overlapping bands (i.e. regardless of the Absolute Radio Frequency Channel Number (ARFCN) that is used). |
| redirectedCarrierInfo |
| The redirectedCarrierInfo indicates a carrier frequency (downlink for frequency division duplex (FDD)) and is used to redirect the wireless device to an |

TABLE 1-continued

A description of the fields in an RRCConnection Release message
RRCConnectionRelease field descriptions E-UTRA or an inter-RAT carrier frequency, by means of the cell selection upon
leaving RRC_CONNECTED as specified in TS 36.304.
releaseCause The releaseCause is used to indicate the reason for releasing the RRC
Connection. The cause value cs-FallbackHighPriority is only applicable when
redirectedCarrierInfo is present with the value set to utra-FDD, utra-TDD or utra-
TDD-r10.
E-UTRAN should not set the releaseCause to loadBalancingTAURequired or
to cs-FallbackHighPriority if the extendedWaitTime is present.
systemInformation Container for system information of the GERAN cell i.e. one or more System
Information (SI) messages as defined in TS 44.018
t320

A timer T320. Value minN corresponds to N minutes.
utra-BCCH-Container

Contains System Information Container message as defined in TS 25.331
Conditional

| presence | Explanation |
| --- | --- |
| EARFCN-max | The field may be mandatory if the corresponding carrierFreq (i.e. without suffix) is set to maxEARFCN. Otherwise the field may not be present. |
| IdleInfoEUTRA | The field is optionally present, need OP, if the IdleModeMobilityControlInfo (i.e. without suffix) is included and includes freqPriorityListEUTRA; otherwise the field is not present. |
| NoRedirect-r8 | The field is optionally present, need OP, if the redirectedCarrierInfo (i.e. without suffix) is not included; otherwise the field is not present. |
| Redirection | The field is optionally present, need ON, if the redirectedCarrierInfo is included and set to geran, utra-FDD, utra-TDD or utra-TDD-r10; otherwise the field is not present. |

In Long Term Evolution (LTE), cell quality derivation may be performed by measurements on so-called cell specific reference signals (CRS) derived at least from primary and/or secondary synchronization signals (PSS/SSS) that encode the physical cell identifier (PCI). In other words, for each cell identified by a PCI, the UE is able to derive the cell quality.

A specific aspect in LTE about cell quality derivation (i.e. the reference signal received power, RSRP, reference signal received quality, RSRQ and/or signal-to-interference-plus-noise ratio, SINR, per cell) is that the network may not need to configure parameters for the wireless device to be able to derive the cell quality. A similar computation may be performed in both RRC_CONNECTED and RRC_IDLE modes of operation, although requirements for Radio Resource Management (RRM) measurements may differ (especially depending on the discontinuous reception (DRX) cycle being used).

In New Radio (NR), due to the possible wide range of frequencies that can be deployed (up to 100 GHz), it is expected a wide usage of beamforming of data channels and control channels. That is true especially for in mmWave frequencies propagation is challenging and coverage may be an issue.

For this reason, NR has been designed with reference signals (e.g. configured to be used for channel state information (CSI) reporting and RRM measurements), and synchronization signals, that may be transmitted in beams. Consequently, reference signals used for cell quality derivation may also be transmitted in multiple beams and, therefore cell quality derivation may need to be a function of multiple beams transmitting reference signals carrying the same PCI.

For RRC_CONNECTED, the following measurement model has been agreed in 3GPP. In RRC_CONNECTED, the wireless device measures multiple beams (at least one) of a cell and the measurements results (power values) are averaged to derive the cell quality. In doing so, the wireless device may be configured to consider a subset of the detected beams: for example, the N best beams above an absolute threshold. Filtering may take place at two different levels: at the physical layer to derive beam quality and then at RRC level to derive cell quality from multiple beams. Cell quality from beam measurements may be derived in the same way for the serving cell(s) and for the non-serving cell(s). Measurement reports may contain the measurement results of the X best beams if the UE is configured to do so by the gNB.

FIG. 1 illustrates a measurement model. The corresponding high-level measurement model is described below:

K beams correspond to the measurements on NR-synchronization signal block or channel state information resource signalling (CSI-RS) resources configured for L3 mobility by gNB and detected by UE at L1.

The signal A comprises measurements, for example beam specific samples internal to the physical layer.

The layer 1 filtering comprises internal layer 1 filtering of the inputs measured at point A. The exact filtering used may implementation dependent. How the measurements are actually executed in the physical layer by an implementation (inputs A and Layer 1 filtering) is not currently constrained by the standard.

The signal $A^1$ comprises measurements (i.e. beam specific measurements) reported by layer 1 to layer 3 after layer 1 filtering.

In the Beam Consolidation/Selection beam specific measurements are consolidated to derive the cell quality of the number of beams have a quality above the threshold N>1, else when N=1 the best beam measurement is selected to derive cell quality. The behaviour of the Beam consolidation/selection may be standardised and the configuration of this module may be provided by RRC signalling. The reporting period at B equals one measurement period at $A^1$.

The signal B comprises a measurement (i.e. cell quality) derived from beam-specific measurements reported to layer 3 after beam consolidation/selection.

The Layer 3 filtering for cell quality comprises filtering performed on the measurements provided at point B. The behaviour of the Layer 3 filters may be standardised and the configuration of the layer 3 filters may be provided by RRC signalling. The filtering reporting period at C equals one measurement period at B.

The signal C comprises a measurement after processing in the layer 3 filter. The reporting rate is identical to the reporting rate at point B. This measurement is used as input for one or more evaluation of reporting criteria.

Evaluation of reporting criteria comprises checking whether actual measurement reporting is necessary at point D. The evaluation can be based on more than one flow of measurements at reference point C e.g. to compare between different measurements. This is illustrated by input C and $C^1$. The wireless device may evaluate the reporting criteria at least every time a new measurement result is reported at point C, $C^1$. The reporting criteria may be standardised and the configuration is provided by RRC signalling (UE measurements).

The signal D comprises measurement report information (message) sent on the radio interface.

The layer 3 (L3) Beam filtering comprises filtering performed on the measurements (i.e. beam specific measurements) provided at point $A^1$. The behaviour of the beam filters may be standardised and the configuration of the beam filters may be provided by RRC signalling. The filtering reporting period at E equals one measurement period at $A^1$.

The signal E comprises a measurement (i.e. beam-specific measurement) after processing in the beam filter. The reporting rate may be identical to the reporting rate at point $A^1$. This measurement may be used as input for selecting the X measurements to be reported.

The Beam Selection for beam reporting comprises selecting the X measurements from the measurements provided at point E. The behaviour of the beam selection may be standardised and the configuration of this module may be provided by RRC signalling.

The signal F comprises beam measurement information included in measurement report (sent) on the radio interface.

More details on the COD in RRC_CONNECTED are provided in the RRC specification. The parameters of the maximum number of beams to average and 09consolidation threshold may be provided per frequency in the measurement object, as shown below Appendix 2.

The procedure for CQD in RRC_CONNECTED using these parameters may be defined as described below.

The network may configure the wireless device to derive RSRP, RSRQ and SINR measurement results per cell associated with NR carrier frequencies based on parameters configured in the field measObject (e.g. maximum number of beams to be averaged and beam consolidation thresholds) and in the field reportConfig (rsType to be measured, SS/PBCH block or CSI-RS).

The wireless device may for each cell measurement quantity to be derived based on SS/PBCH block, if nrofSS-BlocksToAverage in the associated measObject is not configured; or if absThreshSS-BlocksConsolidation in the associated measObject is not configured; or if the highest beam measurement quantity value is below absThreshSS-Blocks-Consolidation: derive each cell measurement quantity based on SS/PBCH block as the highest beam measurement quantity value, where each beam measurement quantity is described in TS 38.215.

Otherwise, if nrofSS-BlocksToAverage in the associated measObject is configured the wireless device may derive each cell measurement quantity based on SS/PBCH block as the linear average of the power values of the highest beam measurement quantity values above absThreshSS-Blocks-Consolidation where the total number of averaged beams shall not exceed nrofSS-BlocksToAverage.

The wireless device may then apply layer 3 cell filtering as described earlier.

The wireless device may for each cell measurement quantity to be derived based on CSI-RS consider a CSI-RS resource on the associated frequency to be applicable for deriving cell measurements when the concerned CSI-RS resource is included in the csi-rs-ResourceConfigMobility with the corresponding physCellId and CSI-RS-CellMobility in the associated measObject.

If nrofCSI-RS-ResourcesToAverage in the associated measObject is not configured; or if absThreshCSI-RS-Consolidation in the associated measObject is not configured; or if the highest beam measurement quantity value is below absThreshCSI-RS-Consolidation the wireless device may derive each cell measurement quantity based on CSI-RS as the highest beam measurement quantity value, where each beam measurement quantity is described in TS 38.215.

Otherwise, the wireless device may derive each cell measurement quantity based on CSI-RS as the linear average of the power values of the highest beam measurement quantity values above absThreshCSI-RS-Consolidation where the total number of averaged beams shall not exceed nroCSI-RS-ResourcesToAverage;

The wireless device may then apply layer 3 cell filtering as described above.

There currently exist certain challenge(s) In RAN2, it has been discussed how the UE shall perform cell quality derivation when it is in RRC_IDLE and/or RRC_INACTIVE. For example, the Cell quality derivation for cell selection is up to UE implementation. Furthermore, as a baseline for cell reselection, for multiple beams, the derivation formula used in Connected mode for cell quality may also applicable to Idle mode; i.e. the quality is calculated as a linear average over up to N best beams above a threshold which are configured per carrier and broadcasted. Further optimization may be considered, e.g., considering on the number of actual good beams (the quality of the beam is above the threshold) for cell reselection.

COD parameters that may be used by a wireless device operating in RRC_INACTIVE or RRC_IDLE may be broadcasted by the network. For example, in System information block 2 (SIB2), the network may broadcast CQD parameters for intra-frequency measurements and in system information block 4 (SIB4), the network may broadcast CQD parameters for inter-frequency measurements, as shown below in Appendix 3.

However some wireless devices may consider a number of beams in cell reselection rules, other wireless devices may not.

Considering the existing rules as described above for CQD defined for RRC_CONNECTED wireless devices and the fact that CQD parameters to be used by wireless devices operating in RRC_IDLE and RRC_INACTIVE may be broadcasted, a wireless just entering RRC_IDLE or RRC_INACTIVE may perform CQD differently from how it has just been performing in RRC_CONNECTED depending on which parameters are being broadcasted. This change in how the wireless device performs CQD may lead to a state transition to idle/inactive immediately followed up by cell reselection and/or even worse, state transitions to RRC_CONNECTED followed up by handovers (as cell quality differs in idle/inactive and connected modes).

Furthermore, according to current NR specifications, in RRC_CONNECTED, the network has the possibility to provide different CQD parameters (per carrier) for different wireless devices, for example, taking into account aspects such as the capabilities of the wireless device, for example, ability to handle beamformed reference signals, or the importance that the network places on the usage of multiple beams in the CQD (hence controlling the threshold and the maximum number of beams for the average in the CQD). The flexibility of providing different CQD parameters per wireless is not possible for UEs in RRC_INACTIVE or in RRC_IDLE state as the CQD parameters are broadcasted to all wireless devices in these modes of operation.

In addition to these problems, as CQD parameters will be broadcasted, there is no way to distinguish them between the wireless devices operating in RRC_INACTVE and the wireless devices operating in RRC_IDLE UEs. In other words the flexibility of providing CQD parameters per wireless device is not possible for different wireless devices or possible for the different modes RRC_INACTIVE or RRC_IDLE.

Certain aspects of the present disclosure and their embodiments may provide solutions to these or other challenges.

Embodiments disclosed herein introduce a new mechanism that enables each specific wireless device entering RRC_IDLE or RRC_INACTIVE (coming from RRC_CONNECTED) to perform CQD based on parameters provided in dedicated signaling to the wireless device. Parameters may still be broadcasted for wireless devices operating in RRC_IDLE and RRC_INACTIVE. The embodiments disclosed herein also provide a set of rules for the usage of these CQD parameters. For example, in certain conditions the wireless device may stop using the CQD parameters provided using dedicated signaling when the wireless device entered RRC_IDLE or RRC_INACTIVE and starts to obtain the parameters acquired in system information broadcasted by the network.

In some embodiments, CQD parameters (possibly including other measurement related parameters) may be introduced in the a field, for example IdleMobilityControlInfo (or a field equivalently defined for idle and/or inactive wireless devices, which may be the same or different for other technologies) transmitted in the control message that triggers the transition of the wireless device from a first mode of operation, e.g. RRC_CONNECTED to a second mode of operation, e.g. RRC_IDLE or RRC_INACTIVE.

SUMMARY

There are, proposed herein, various embodiments which address one or more of the issues disclosed herein. Certain embodiments may provide one or more of the following technical advantage(s).

According to some embodiments there is provided a method performed by a wireless device for performing a cell measurement. The method comprising receiving a first control message from a base station instructing the wireless device to transition from a first mode of operation to a second mode of operation; and responsive to the control message comprising information relating to at least one first cell measurement parameter, performing a cell measurement according to the at least one first cell measurement parameter.

According to some embodiments there is provided a method performed by a base station for instructing a wireless device how to perform cell measurements. The method comprising: transmitting a first control message to the wireless device instructing the wireless device to transition from a first mode of operation to a second mode of operation, wherein the control message comprises information relating to at least one first cell measurement parameter for use by the wireless device in performing cell measurements whilst in the second mode of operation.

According to some embodiments there is provided a wireless device for performing a cell measurement. The wireless device comprises processing circuitry configured to: receive a first control message from a base station instructing the wireless device to transition from a first mode of operation to a second mode of operation; and responsive to the control message comprising information relating to at least one first cell measurement parameter, perform a cell measurement according to the at least one first cell measurement parameter.

According to some embodiments there is provided a base station for instructing a wireless device how to perform cell measurements. The base station comprises processing circuitry configured to transmit a first control message to the wireless device instructing the wireless device to transition from a first mode of operation to a second mode of operation, wherein the control message comprises information relating to at least one first cell measurement parameter for use by the wireless device in performing cell measurements whilst in the second mode of operation.

By applying the mechanism disclosed in the invention, the network has the flexibility to provide different CQD parameters for IDLE and INACTIVE wireless devices. In addition, when deciding how to configure CQD parameters the network can consider wireless device capability aspects related to the manner in which the wireless device performs beamforming operations, for example, the number of receiving beams, maximum number of detectable beams, sensitivity thresholds for beam detection, etc.

Another advantage is that as the message suspending or releasing the RRC connection is transmitted in SRB1 (i.e. is integrity protected and encrypted) the network can therefore provide any sensitive parameter that it might not be recommended to be broadcasted.

BRIEF DESCRIPTION OF THE DRAWINGS

FIG. 11 illustrates a method in accordance with some embodiments;

DESCRIPTION

Figure 1:
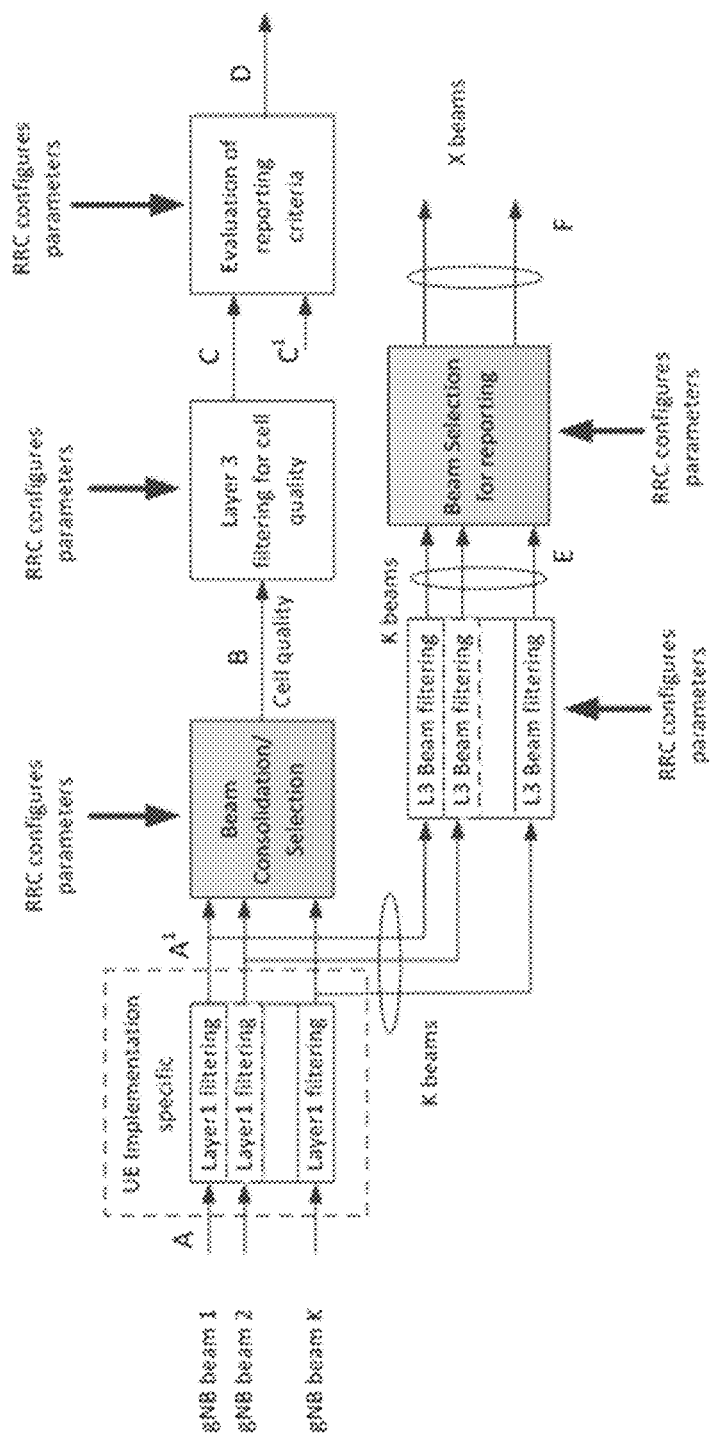
FIG. 1 illustrates a measurement model.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In the embodiments described herein, the term "Cell Quality Derivation parameters (CQD) parameter(s)" may be used to refer to the parameters used to derive cell quality based on beamformed reference signals. The beamformed reference signals may for example comprise one or more of synchronization signal blocks, SSB, Physical Broadcast Channel, PBCH, blocks and Chanel Status Information Reference Signals, CSI-RS.

For example, a COD parameter may be defined per measurement object in a first mode of operation, for example RRC_CONNECTED and, for wireless devices which are entering a second mode of operation, for example RRC_IDLE or RRC_INACTIVE the CQD parameter may be defined per carrier frequency or frequency where a reference signal is being transmitted.

Some examples of CQD parameters are as follows:

1) Maximum number of beams to be averaged when performing COD.

There may be a value for the maximum number of beams for be averages for SS/PBCH block-based measurements (nrofSS-BlocksToAverage) and another value for CSI-RS based measurements (nrofCSI-RS-ResourcesToAverage), as defined also for RRC_CONNECTED.

If the field is configured (for example with an integer starting with value 2), the wireless device may be configured to average according to a given rule a number of measurements per beam, where number of beams is less than or equal to this maximum value.

2) Consolidation threshold when selecting beams to perform CQD

There may be one value for the consolidation threshold for SS/PBCH block-based measurements (absThreshSS-BlocksConsolidation) and another value for CSI-RS based measurements (absThreshCSI-RS-Consolidation).

If the field is configured the wireless device may select for averaging (if averaging is configured) the best beam per configured measurement quantity (i.e. one with highest value for that particular measurement quantity) and the remaining beams above the configured threshold.

3) Reference signal (RS) type to be used for COD;

The type of reference signal can be synchronization signal block SSB (SS/PBCH block), Channel State information Reference signal (CSI-RS) or both.

In the first mode of operation, for example RRC_CONNECTED, CQD parameters for both RS types may be provided to the wireless device in each measurement object for example per carrier frequency. However, it is in each measurement identifier/report configuration that the network signals which RS type shall be used by the wireless device to perform COD for a given measurement event.

In this invention, as this is to be used for wireless devices operating in a second low power consumption mode of operation, for example RRC_IDLE/RRC_INACTIVE, which do not have a reporting configuration, the RS type(s) to be used for cell reselection, per carrier, may be signaled to the wireless device when it enters the second mode of operation using the CQD parameters.

If cell reselection rules defined in the system information only contain rules for SSB (or instructs the wireless devices to only perform re-selection/selection based on SSB) and the wireless device has received CQD parameters enabling it to compute both SSB and CSI-RS based cell qualities, the wireless device may perform CQD associated to the rule broadcasted in system information, i.e. only using SSB.

Else, if cell reselection rules defined in the system information contain rules for SSB (or instructs the UEs to only perform re-selection/selection based on SSB) and the wireless device has parameters to compute both SSB and CSI-RS based cell qualities, the wireless device may only perform CQD associated to the rule broadcasted in system information.

4) SSB configuration(s);

This parameter may indicate SSB configuration(s) per cell and/or per carrier such as the exact resources being transmitted and/or the optimized measurement window for a particular cell and/or frequency (for example, more optimized in comparison to the equivalent parameter broadcasted in system information, if any); Other configurations equivalent to the ones a wireless device operating in the first mode of operation, for example RRC_CONNECTED can be provided with, as shown in the example implementation of the SSB configuration parameter below for a particular carrier:

```
ssbFrequency
                                        ARFCN-ValueNR
                                                OPTIONAL,
           -- SSB configuration for mobility (nominal SSBs, timing
configuration)
           ssb-ConfigMobility
                                        SSB-ConfigMobility
                                        OPTIONAL, -- Need M
-- A measurement timing configuration
SSB-ConfigMobility::=    SEQUENCE {
                              --Only the values 15, 30 or 60 kHz
                              (<6GHz),
60 or 120 kHz (>6GHz) are applicable
                              subcarrierSpacing
SubcarrierSpacing,
-- The set of SS blocks to be
measured within the SMTC measurement duration.
                     --  Corresponds    to    L1    parameter
'SSB-measured' (see FFS_Spec, section FFS_Section)
                              -- When the field is absent the UE
measures on all SS-blocks
                              -- FFS_CHECK: Is this IE placed
                              correctly.
                              ssb-ToMeasure
                     SetupRelease { SSB-ToMeasure }
```

```
                OPTIONAL, -- Need M
            -- Indicates whether the UE can utilize serving cell
timing to derive the index of SS block transmitted by neighbour cell:
                useServingCellTimingForSync
                    BOOLEAN,
            -- Primary measurement timing configuration. Applicable
for intra- and inter-frequency measurements.
            smtc1
            SEQUENCE {
                    -- Periodicity and offset of the
measurement window in which to receive SS/PBCH blocks.
                    -- Periodicity and offset are given in
number of subframes.
                    -- FFS_FIXME: This does not match the
L1 parameter table! They seem to intend an index to a hidden table
in L1 specs.
                    -- (see 38.213, section REF):
                periodicityAndOffset
                        CHOICE {
                        sf5
                        INTEGER (0..4),
                        sf10
                INTEGER (0..9),
                        sf20
                INTEGER (0..19),
                        sf40
                INTEGER (0..39),
                        sf80
                INTEGER (0..79),
                        sf160
                INTEGER (0..159)
                },
                -- Duration of the measurement window in
which to receive SS/PBCH blocks, It is given in number of subframes
                -- (see 38.213, section 4.1)
                duration
                ENUMERATED { sf1 , sf2, sf3, sf4, sf5 }
            },
            -- Secondary measurement timing confguration for
explicitly signalled PCIs. It uses the offset and duration from smtc1.
            -- It is supported only for intra-frequency
measurements in RRC CONNECTED.
            smtc2
            SEQUENCE {
                    -- PCIs that are known to follow
                    this SMTC.
                pci-List
            SEQUENCE (SIZE (1..maxNrofPCIsPerSMTC)) OF
PhysCellId              OPTIONAL, -- Need M
                    -- Periodicity for the given PCIs. Timing
offset and Duration as provided in smtc1.
                periodicity
            ENUMERATED {st5, sf10, sf20, sf40, sf80, sf160,
spare2, spare1}
```

```
            }
                    OPTIONAL,--Cond IntraFreqConnected
        ss-RSSI-Measurement
                            SEQUENCE {
                    measurementSlots
            CHOICE {
                            kHz15
                            BIT STRING (SIZE(1)),
                            kHz30
                            BIT STRING (SIZE(2)),
                            kHz60
                            BIT STRING (SIZE(4)),
                            kHz120
                            BIT STRING (SIZE(8))
            },
                endSymbol
        INTEGER(0..13)
            }
                            OPTIONAL
        }
        SSB-ToMeasure ::=                   CHOICE {
                -- bitmap for sub 3 GHz
                shortBitmap
                            BIT STRING (SIZE (4)),
                -- bitmap for 3-6 GHz
                mediumBitmap
                            BIT STRING (SIZE (8)),
                -- bitmap for above 6 GHz
                longBitmap
                            BIT STRING (SIZE (64))
        }
```

5) CSI-RS configuration(s);

This parameter may indicate a CSI-RS configuration(s) per cell so that the wireless device is able to perform CQD for CSI-RS measurements. The field and information element to be included in the message instructing the wireless device to transition into the second mode of operation may include the following: a reference frequency to locate CSI-RS resources per cell per carrier, an indication of the signal to be used for synchronization (e.g. cell identifiers like the physical cell identifier); a group of resources that can possibly be averaged in case COD is configured to be performed with an average; subcarrier spacing; sequence configuration(s); time/frequency resources where CSI-RSs are to be detected; and/or bandwidth etc.

An example of CSI-RS configurations that could be possibly provided to the wireless device entering the second mode of operation, not only limited to the ones described above, is provided below in the example ASN.1 format:

```
refFreqCSI-RS
                            ARFCN-ValueNR
                                    OPTIONAL,
            -- CSI-RS resources to be used for CSI-RS based RRM
measurements
            csi-rs-ResourceConfigMobility
                SetupRelease   {  CSI-RS-ResourceConfigMobility  }
OPTIONAL-- Need M
CSI-RS-ResourceConfigMobility ::=           SEQUENCE {
                -- MO specific values
                    isServingCellMO
                                    BOOLEAN,
                -- Subcarrier spacing of CSI-RS.
                -- Only the values 15, 30 or 60 kHz (<6GHz), 60 or 120
kHz (>6GHz) are applicable.
                -- Corresponds to L1 parameter 'Numerology'
(see 38.211, section FFS_Section)
                    subcarrierSpacing
                                    SubcarrierSpacing,
                -- List of cells
                    csi-RS-CellList-Mobility      SEQUENCE     (SIZE
(1..maxNrofCSI-RS-CellsRRM))      OF CSI-RS-CellMobility
```

```
}
CSI-RS-CellMobility ::=                                              SEQUENCE {
                cellId
                PhysCellId,
                csi-rs-MeasurementBW
                                SEQUENCE {
                                -- Allowed size of the measurement BW in
PRBs
                                -- Corresponds to L1 parameter 'CSI-RS-
measurementBW-size' (see FFS_Spec, section FFS_Section)
                                nrofPRBs
                ENUMERATED    {   size24,    size48,    size96,
size192, size264},
                                -- Starting PRB index of the measurement
                                bandwidth
                                -- Corresponds to L1 parameter 'CSI-RS-
measurement-BW-start' (see FFS_Spec, section FFS_Section)
                                -- FFS_Value: Upper edge of value range
unclear in RAN1
                                startPRB
                INTEGER(0..2169)
                },
                -- Frequency domain density for the 1-port CSI-RS
for L3 mobility
                -- Corresponds to L1 parameter 'Density'
(see FFS_Spec, section FFS_Section)
                density
                ENUMERATED {d1,d3}
                                                                     OPTIONAL,
-- List of resources
                csi-rs-ResourceList-Mobility                         SEQUENCE
(SIZE (1..maxNrofCSI-RS-ResourcesRRM))         OF CSI-RS-Resource-Mobility
}
CSI-RS-Resource-Mobility ::=                                         SEQUENCE {
                csi-RS-Index
                                        CSI-RS-Index,
                -- Contains periodicity and slot offset for periodic/semi-
persistent CSI-RS (see 38.211, section x.x.x.x)FFS_Ref
                slotConfig
                                                                     CHOICE {
                                ms4
                                INTEGER (0..31),
                                ms5
                                INTEGER (0..39),
                                ms10
                INTEGER (0..79),
                                ms20
                INTEGER (0..159),
                                ms40
                INTEGER (0..319)
                },
                -- Each CSI-RS resource may be associated with one SSB.
If such SSB is indicated, the NW also indicates whether the UE may assume
                -- quasi-colocation of this SSB with this CSI-RS reosurce,
                -- Corresponds to L1 parameter 'Associated-SSB' (see
FFS_Spec, section FFS_Section)
                associatedSSB
                                                                     SEQUENCE {
                                ssb-Index
                                SSB-Index,
                                -- The CSI-RS resource is either QCL'ed not
QCL'ed with the associated SSB in spatial parameters
                                -- Corresponds to L1 parameter 'QCLed-SSB'
(see FFS_Spec, section FFS_Section)
                                isQuasiColocated
                                                                     BOOLEAN
                }
                OPTIONAL, -- Cond AssociatedSSB
                -- Frequency domain allocation within a physical resource
block in accordance with 38.211, section 7.4.1.5.3 including table 7.4.1.5.2-1.
                -- The number of bits that may be set to one depend on the
chosen row in that table. For the choice "other", the row can be determined from
                -- the parmeters below and from the number of bits set to
1 in frequencyDomainAllocation.
                frequencyDomainAllocation
                CHOICE {
                                row1
                                                                     BIT
STRING (SIZE (4)),
```

```
                       row2
                                                       BIT
STRING (SIZE (12))
                  },
                  -- Time domain allocation within a physical resource block.
The field indicates the first OFDM symbol in the PRB used for CSI-RS.
                  -- Parameter I₀ in 38.211, section 7.4.1.5.3. Value 2 is
supported only when DL-DMRS-typeA-pos equals 3.
                  firstOFDMSymbolinTimeDomain
                       INTEGER (0..13),
                  -- Scrambling ID for CSI-RS(see 38.211, section 7.4.1.5.2)
                  sequenceGenerationConfig
                            INTEGER (0..1023),
                       ...
}
CSI-RS-Index ::=                                       INTEGER
(0..maxNrofCSI-RS-ResourcesRRM-1)
```

6) Other parameters usually provided in measurement object for RRC_CONNECTED UES Other CQD parameters may for example comprise black lists of cells not to be included; white lists of cells; per frequency offsets; s-Measure (possibly per RS type and measurement quantity); filtering coefficient configuration(s).

Wireless Devices Entering RRC IDLE

The CQD parameters, for example as described above, may be provided as part of a field in the control message triggering the wireless device to enter RRC_IDLE. In NR, this message may be possibly called RRCRelease, and may possibly defined as follows:

Wireless Devices Entering RRC INACTIVE

The CQD parameters, e.g., as described above, may be provided as part of a field in the control message triggering the wireless device to enter RRC_INACTIVE. In NR, this message may be possibly called RRCSuspend or RRCRelease with a suspend indicator, indicating that the wireless device should enter RRC_INACTIVE instead of RRC_IDLE, possibly defined as follows:

```
-        RRCSuspend
The RRCSuspend message is used to suspend an RRC connection.
Signalling radio bearer: SRB1
RLC-SAP: AM
Logical channel: DCCH
Direction: Network to UE
RRCSuspend message
-- ASN1START
-- TAG-RRCSUSPEND-START
RRCSuspend ::=                    SEQUENCE {
    rrc-TransactionIdentifier              RRC-TransactionIdentifier,
    criticalExtensions                     CHOICE {
        c1                                              CHOICE {
                        rrcSuspend             RRCSuspend-IEs,
                        spare3 NULL, spare2 NULL, spare1 NULL
        },
        criticalExtensionsFuture                        SEQUENCE { }
    }
}RRCSuspend-IEs ::=                SEQUENCE {
    resumeIdentity                         I-RNTI-Value,
    PagingCycle                                         FFS_Type,
    ran-NotificationAreaInfo               RAN-NotificationAreaInfo,
    periodic-RNAU-timer                    ENUMERATED {ffsValues},
    nextHopChainingCount                   NextHopChainingCount,
    redirectedCarrierInfo                  RedirectedCarrierInfo
    OPTIONAL,       -- Need N idleModeMobilityControlInfo
    IdleModeMobilityControlInfo            OPTIONAL,        -- Need M
    lateNonCriticalExtension                            OCTET STRING
                                                                OPTIONAL,
    nonCriticalExtension                                SEQUENCE{ }
    OPTIONAL
}
RAN-NotificationAreaInfo              ::= CHOICE {
    cellList                              SEQUENCE (SIZE (1..32)) OF CellIdentity,
    ran-AreaConfigList                    RAN-AreaConfigList,
}RAN-AreaConfigList   ::=              SEQUENCE (SIZE (1..16)) OF RAN-
AreaConfig
RAN-AreaConfig ::=    SEQUENCE {
    trackingAreaCode                      TrackingAreaCode
    ran-AreaCodeList                      SEQUENCE (SIZE (1..32)) OF      RAN-
AreaCode                    OPTIONAL
}
    RAN-AreaCode::=                                     BIT STRING (SIZE (6))
```

-- TAG-RRCSUSPEND-STOP
-- ASN1STOP

Although we have shown in the examples above the CQD parameter being encoded as part of the IdleMobilityControlInfo (or equivalent information element defined for NR, possibly differing for IDLE or INACTIVE wireless devices), a new information element and/or field may also be defined for these COD parameters. In the case of a new information element, a new timer different from the one defined for IdleMobilityControlInfo (i.e. t320) can be associated with the CQD parameters.

In some example embodiments therefore the wireless device may be configured to receive a first control message from a base station instructing the wireless device to transition from a first mode of operation to a second mode of operation; and responsive to the control message comprising information relating to at least one first cell measurement parameter, perform a cell measurement according to the at least one first cell measurement parameter.

For example, the first mode of operation may be associated with a first level of signaling overhead and the second mode of operation may be associated with a second level of signaling overhead which is less than the first level of signaling overhead.

For example the first mode of operation may be optimized for uplink and downlink data transmission and the second mode of operation is optimized to minimize power consumption of the wireless device.

For example, the first mode of operation may comprise a RRC_CONNECTED mode of operation. The second mode of operation may comprise an RRC_idle or an RRC_inactive mode of operation.

In the examples described herein the least one first measurement parameter comprises at least one first cell quality derivation, CQD, parameter for use in determining cell quality based on beamformed reference signals. In particular the at least one first CQD parameter may be associated with one or more frequencies, one or more cell(s) or one or more frequencies each associated with one or more cells. However, it will be appreciated that the methods described here may be applied to any type of measurement which may be performed by a wireless device operating in both a first mode and a second mode of operation, in particular where the second mode of operation comprises a lower power mode of operation.

The at least one first CQD parameter may comprise one or more of: an indication of a maximum number of beams to be averaged when performing CQD; an indication of a threshold quality for beams to be used to estimate cell quality; an indication of a resource type to be used to determine cell quality; a synchronization signal block configuration; and a channel state information reference signal, CSI-RS, configuration.

In examples described herein, the cell measurement may comprise determining a cell quality of one or more cells from which the wireless device is receiving beamformed reference signals. For example the cell quality may comprise one of more of: a reference signal received power, RSRP, a reference signal received quality RSRQ and/or a signal-to-interference-plus-noise ratio, SINR.

The wireless device receiving the at least one first COD parameter in the control message may therefore utilize these parameters to perform cell quality derivation. However, in some examples, the wireless device may not receive a control message comprising CQD parameters, or may be configured to stop using the parameters under certain circumstances. In these cases the wireless device may switch to using at least one second COD parameter received in broadcasted system information from the network.

For example, the at least one second CQD parameter may correspond to the at least one first CQD parameter. For example, the at least one first CQD parameter may comprise a parameter indicating a maximum number of beams to be averaged when performing CQD, and so may the at least one second CQD parameter. However the value attributed to the each parameter in the first CQD parameters and the second CQD parameters may be different.

In some embodiments, the wireless device may be configured to responsive, to the first control message not comprising information relating to the at least one first CQD parameter, determine cell quality according to the at least one second CQD parameter. In other words, upon receiving the first control message (e.g. RRCRelease) from the network instructing the wireless device to enter RRC_IDLE or RRC_INACTIVE, if the message contains CQD parameter(s), the wireless device may enter the appropriate mode and perform CQD according to these parameters. However, if the first control message does not comprise COD parameters, the wireless device may utilize the CQD parameters which are broadcasted by the network. The measurements made using the CQD parameters may be used as input values for cell reselection rules.

In some embodiments the wireless device may be configured to, responsive to receiving a second control message instructing the wireless device to transition from the second mode of operation back to the first mode of operation, determine cell quality according to at least one third CQD parameter received during the first mode of operation or a pre-defined default rule indicating how to determine cell quality when the UE enters the first mode of operation, for example when no third CQD parameters are received in the first mode of operation.

In other words, upon receiving the first control message (e.g. RRCRelease) from the network to instruct the wireless device to enter RRC_IDLE or RRC_INACTIVE, if the message contains CQD parameter(s), the wireless device may enter RRC_IDLE or RRC_INACTIVE and may perform CQD according to these parameters until it enters RRC_CONNECTED coming from RRC_IDLE or RRC_INACTIVE again.

In some embodiments the wireless device may be configured to responsive to the wireless device performing cell reselection to a cell in which cell reselection rules are associated with a resource type which is not configured in the at least one first CQD parameter, determine cell quality according to the at least one second CQD parameter. The resource type may comprise a reference signal type, frequency or frequency band, and/or measurement quantity.

For example, upon receiving the message (e.g. RRCRelease) from the network to instruct the wireless device to enter RRC_IDLE or RRC_INACTIVE, if the message contains COD parameter(s), the wireless device may enter RRC_IDLE or RRC_INACTIVE and perform CQD according to these parameters until it performs cell reselection to a cell where cell reelection rules are associated to an RS type that has not been configured when the wireless device has entered RRC_IDLE or RRC_INACTIVE. In that case the wireless device may acquire CQD parameters and perform measurements according to the ones broadcasted in the system information. In some embodiments the wireless device may be configured to responsive to the first control message comprising a timer associated with the at least one first CQD parameter, start the timer upon receipt of the control message; determine cell quality according to the at least one first CQD parameter until the timer expires; and determine cell quality according to the at least one second CQD parameter after the timer has expired.

For example, if the release message (e.g. RRCRelease or RRCSuspend) contains a timer, the wireless device may enter the appropriate second mode of operation, may start the timer and perform CQD according to the first CQD parameters. When the timer expires the wireless device may stop using these CQD parameters and may start to use the second CQD parameters broadcasted in the system information. The timer may be the t320 timer in IdleMobilityControlInfo or may be a separate timer associated with the at least one first CQD parameter. The timer may stop when the wireless device enters the first mode of operation, or when the cell reselection rules are associated to an reference signal type that has not been configured when the wireless device entered the second mode of operation. In that case the wireless device may acquire the second CQD parameters and perform measurements according to the at least one second CQD parameter.

In some embodiments the wireless device may be configured to stop using the at least one first CQD parameter when a rejection message is received from the network in response to the wireless device attempting to re-enter the first mode of operation.

For example, upon receiving the first control message (e.g. RRCRelease) from the network to instruct the wireless device to enter RRC_IDLE or RRC_INACTIVE, if the message contains at least one first CQD parameter(s), the wireless device may enter RRC_IDLE or RRC_INACTIVE and perform CQD according to these parameters until it receives an RRCReject message when trying to enter RRC_CONNECTED coming from RRC_IDLE or RRC_INACTIVE and being rejected by the network.

In some embodiments the wireless device may be configured to receive the first control message whilst the wireless device is located with a first radio access network notification area, RNA; and responsive to the wireless device moving from the first RNA to a second RNA, determine cell quality according to the at least one second CQD parameter.

For example, upon receiving the first control message (e.g. RRCRelease or RRC Suspend) from the network to instruct the wireless device to enter RRC_IDLE or RRC_INACTIVE, if the first control message contains at least one first CQD parameter(s), the wireless device may enters RRC_IDLE or RRC_INACTIVE and perform CQD according to the at least one first parameter until it moves within the configured radio access node (RAN) Notification Area (RNA). When the wireless device leaves the configured RAN area, the wireless device may start using at least one second CQD parameter broadcasted in the system information.

For example upon receiving the message (e.g. RRCSuspend or RRCRelease with a suspend indicator) from the network to instruct the wireless device to enter RRC_INACTIVE, if the message contains at least one first COD parameter(s), the wireless device may enter RRC_INACTIVE and perform CQD according to the at least one first CQD parameter until it receives an RRCSuspend message to RRC_INACTIVE, for example when performing RNA update in RRC_INACTIVE.

In some embodiments the wireless device may be configured to receive the first control message whilst the wireless device is being served by a first cell, and responsive to the wireless device handing over from the first cell to a second cell, wherein the second cell is not a cell on a predetermined cell list, determine cell quality according to the at least one second CQD parameter.

For example, upon receiving the first control message (e.g. RRCRelease or RRCSuspend) from the network to instruct the wireless device to enter RRC_IDLE or RRC_INACTIVE, if the first control message contains at least one first CQD parameter(s), the wireless device may enter RRC_IDLE or RRC_INACTIVE and perform CQD according to the at least one first CQD parameters until it moves within a configured list of cells (not necessarily the configured RNA). When the wireless device leaves the configured list of cells, the wireless device may start using at least one second CQD parameter broadcasted in the system information.

The predetermined cell list may be provided in the first control message. In some embodiments the predetermined cell list comprises one single cell, that is the cell the wireless device was connected to when receiving the first control message (in that example, there might be no need for configuration of the predetermined cell list in the first control message).

In some embodiments the wireless device may be configured to responsive to the wireless device performing a predefined number of cell re-selections, determine cell quality according to the at least one second CQN parameter.

For example, upon receiving the first control message (e.g. RRCRelease or RRCSuspend) from the network to instruct the wireless device to enter RRC_IDLE or RRC_INACTIVE, if the first control message contains at least one first CQD parameter(s), the wireless device may enter RRC_IDLE or RRC_INACTIVE and perform CQD according to the at least one first CQD parameter until it performs a predefined number of cell reselections. The predefined number may be pre-defined in the specifications or configured in the release message.

In some embodiments the wireless device may be configured to, responsive to receiving a broadcast indication instructing the wireless device to substitute using a subset of the at least one first CQD parameters for an equivalent subset of the at least one second CQD parameters; determine cell quality based on the equivalent subset of the at least one second CQD parameters.

For example, upon receiving the first control message (e.g. RRCRelease or RRCSuspend) from the network to instruct the wireless device to enter RRC_IDLE or RRC_INACTIVE, if the first control message contains at least one first CQD parameter(s), the wireless device may enter RRC_IDLE or RRC_INACTIVE and perform CQD according to the at least one first CQD parameters until it detects a cell broadcasting an indication to the wireless device to stop using at least a subset of the at least one first COD parameters provided in dedicated signalling when the wireless device entered RRC_IDLE. Notice that the indication can exist for all CQD parameters or a subset of COD parameters.

For example, the network may instruct the wireless device to substitute using the parameter indicating the maximum number of beams to average in the first CQD parameters with the equivalent parameter indicating the maximum number of beams to average in the second CQD parameters.

In some embodiments the at least one first CQD parameter comprises a channel state information reference signal, CSI-RS, configuration. In these examples, the wireless device may be configured to responsive to the wireless device handing over to a base station which indicates that CSI-RS configurations are not used to perform cell re-selection, determine cell quality based on the at least second CQD parameter.

For example, upon receiving the first control message (e.g. RRCRelease or RRCSuspend) from the network to instruct the wireless device to enter RRC_IDLE or RRC_INACTIVE, if the first control message contains at least one first CQD parameter(s) with CSI-RS configurations, the wireless device may enter RRC_IDLE or RRC_INACIVE and perform CQD according to the at least one first CQD parameter except if the cell the wireless device reselects indicates (implicitly or explicitly) that cell reselection shall not be performed based on CSI-RS.

In some embodiments the at least one first CQD parameter comprises a synchronization signal block, SSB, configuration. In these examples, the wireless device may be configured to responsive to the wireless device handing over to a base station which indicates that SSB configurations are not used to perform cell re-selection, determine cell quality based on the at least second CQD parameter.

For example, upon receiving the first control message (e.g. RRCRelease or RRCSuspend) from the network to instruct the wireless device to enter RRC_IDLE or RRC_INACTIVE, if the first control message contains at least one first CQD parameter(s) with SSB configurations, the wireless device may enter RRC_IDLE or RRC_INACTIVE and perform CQD according to the at least one first CQD parameter except if the cell the wireless device reselects indicates (implicitly or explicitly) that cell reselection shall not be performed based on SSBs.

The examples above relate to the usage of CQD parameters, upon entering RRC_IDLE, RRC_INACTIVE or RRC_CONNECTED. However, other parameters used for measurements in general may be considered e.g. system media transport control (SMTC) window, SSB details e.g. which SSBs to measure per frequency, or any other parameter inside the measObjectNR that is used in RRC_CONNECTED but may also be used in RRC_IDLE or RRC_INACTIVE.

In the examples above, in scenarios where the wireless device uses the at least one first CQD parameter provided in the first control message when operating in the second mode of operation, the wireless device may be configured not to acquire the SIBs containing CQD parameters or at least the parts of the SIBs containing the COD parameters.

A first possible implementation in the RRC comprises providing the CQD to the wireless device as part of the information element IdleMobilityControlInfo which already forms part of the RRCRelease or RRCSuspend message.

For example, for a wireless device (or UE) entering RRC_IDLE, the UE may be configured to:
  1> discard any stored UE access stratum (AS) context and I-RNTI;
  1> delay the following actions defined in this sub-clause for X ms from the moment the RRCRelease message was received or optionally when lower layers indicate that the receipt of the RRCRelease message has been successfully acknowledged, whichever is earlier;
  1> if the RRCRelease message includes the idleModeMobilityControlInfo:
    2> store the cell reselection priority information provided by the idleModeMobilityControlInfo;
    2> store the cell quality derivation parameters provided by the idleModeMobilityControlInfo;
    2> if the t320 is included:
      3> start timer T320, with the timer value set according to the value of t320;
  1> else:
    2> apply the cell reselection priority information broadcast in the system information;
    2> apply the cell quality derivation parameters broadcast in the system information;
  1> perform the actions upon going to RRC_IDLE as specified above.

The UE may also be configured to:
  1> if T320 expires:
    2> if stored, discard the cell reselection priority information provided by the idleModeMobilityControlInfo or inherited from another RAT;
    2> if stored, discard the cell quality derivation parameters provided by the idleModeMobilityControlInfo;
    2> apply the cell reselection priority information broadcast in the system information;
    2> apply the cell quality derivation parameters broadcast in the system information;

For example, for a wireless device (or UE) entering RRC_INACTIVE, the UE may be configured to:
  1> delay the following actions defined in this sub-clause X ms from the moment the RRCSuspend message was received or optionally when lower layers indicate that the receipt of the RRCSuspend message has been successfully acknowledged, whichever is earlier;
  1> if the RRCSuspend message includes the idleModeMobilityControlInfo:
    2> store the cell reselection priority information provided by the idleModeMobilityControlInfo;
    2> store the cell quality derivation parameters provided by the idleModeMobilityControlInfo;
    2> if the t320 is included:
      3> start timer T320, with the timer value set according to the value of t320;
  1> else:
    2> apply the cell reselection priority information broadcast in the system information;
    2> apply the cell quality derivation parameters broadcast in the system information;
  1> store the following information provided by the network: resumeIdentity, nextHopChainingCount, ran-PagingCycle and ran-NotificationAreaInfo:
  1> re-establish RLC entities for all SRBs and DRBs;
  1> except if the RRCSuspend message was received in response to an RRCResumeRequest.
    2> store the UE AS Context including the current RRC configuration, the current security context, the PDCP state including ROHC state, C-RNTI used in the source PCell, the cellIdentity and the physical cell identity of the source PCell;
  1> suspend all SRB(s) and DRB(s), except SRB0;
  1> start timer T380, with the timer value set to periodic-RNAU-timer
  1> indicate the suspension of the RRC connection to upper layers;
  1> configure lower layers to suspend integrity protection and ciphering;

1> enter RRC_INACTIVE and perform procedures as specified in TS 38.304

A first second possible implementation in the RRC specs comprises providing the at least one first COD parameter to the wireless device or UE as part of a new field called cellQualityDerivation Parameters to be provided as part of the RRCRelease or RRCSuspend message. In this second implementation a new timer may also be defined which is different from T320. In the following this new timer is referred to as T320xxx. This may leads to the following implementation of the RRC specifications.

For example, for a wireless device (or UE) entering RRC_IDLE, the UE may be configured to:
1> discard any stored UE AS context and I-RNTI;
1> delay the following actions defined in this sub-clause X ms from the moment the RRCRelease message was received or optionally when lower layers indicate that the receipt of the RRCRelease message has been successfully acknowledged, whichever is earlier;
1> if the RRCRelease message includes the idleMode-MobilityControlInfo:
  2> store the cell reselection priority information provided by the idleModeMobilityControlInfo;
  2> if the t320 is included:
    3> start timer T320, with the timer value set according to the value of t320;
1> else:
  2> apply the cell reselection priority information broadcast in the system information;
1> if the RRCRelease message includes the cellQuality-DerivationParameters:
  2> store the cell quality derivation parameters provided by the cellQualityDerivationParameters;
  2> if the t320xxx is included:
    3> start timer T320xxx, with the timer value set according to the value of t320xxx
1> else:
  2> apply the cell quality derivation parameters broadcast in the system information;
1> perform the actions upon going to RRC_IDLE as specified in 5.3.11;

The UE may be further configured to:
1> if T320 expires:
  2> if stored, discard the cell reselection priority information provided by the idleModeMobilityControlInfo or inherited from another RAT; 2> apply the cell reselection priority information broadcast in the system information;

The UE may be further configured to:
1> if T320xxx expires:
  2> if stored, discard the cell quality derivation parameters provided by the cellQualityDerivationParameters;
  2> apply the cell quality derivation parameters broadcast in the system information;

In some examples, for a wireless device (or UE) entering RRC_INACTIVE, the UE may be configured to:
1> delay the following actions defined in this sub-clause X ms from the moment the RRCSuspend message was received or optionally when lower layers indicate that the receipt of the RRCSuspend message has been successfully acknowledged, whichever is earlier;
1> if the RRCSuspend message includes the idleMode-MobilityControlInfo:
  2> store the cell reselection priority information provided by the idleModeMobilityControlInfo; 2> if the t320 is included:
    3> start timer T320, with the timer value set according to the value of t320;
1> else:
  2> apply the cell reselection priority information broadcast in the system information;
1> if the RRCSuspend message includes the cellQuality-DerivationParameters:
  2> store the cell quality derivation parameters provided by the cellQualityDerivationParameters;
  2> if the t320xxx is included:
    3> start timer T320xxx, with the timer value set according to the value of t320xxx
1> else:
2> apply the cell quality derivation parameters broadcast in the system information; 1> store the following information provided by the network: resumeIdentity, nextHopChainingCount, ran-PagingCycle and ran-NotificationAreaInfo;
1> re-establish RLC entities for all SRBs and DRBs;
1> except if the RRCSuspend message was received in response to an RRCResumeRequest
  2> store the UE AS Context including the current RRC configuration, the current security context, the PDCP state including ROHC state, C-RNTI used in the source PCell, the cellIdentity and the physical cell identity of the source PCell;
1> suspend all SRB(s) and DRB(s), except SRB0.
1> start timer T380, with the timer value set to periodic-RNAU-timer
1> indicate the suspension of the RRC connection to upper layers;
1> configure lower layers to suspend integrity protection and ciphering;
1> enter RRC_INACTIVE and perform procedures as specified in TS 38.304

In some embodiments the first control message may be provided by a base station in the network.

For example, the base station may be configured to transmit a first control message to the wireless device instructing the wireless device to transition from a first mode of operation to a second mode of operation, wherein the control message comprises information relating to at least one first cell measurement parameter for use by the wireless device in performing cell measurements whilst in the second mode of operation.

The at least one first measurement parameter comprises at least one first cell quality derivation parameter for use in deriving cell quality based on beamformed reference signals.

The beamformed reference signals may comprise one or more of synchronization signal blocks, SSB, Physical Broadcast Channel, PBCH, blocks and Chanel Status Information Reference Signals, CSI-RS.

The first mode of operation may be associated with a first level of signaling overhead and the second mode of operation may be associated with a second level of signaling overhead which is less that the first level of signaling overhead.

The first mode of operation may be optimized for uplink and downlink data transmission and the second mode of operation may be optimized to minimize power consumption of the wireless device.

The first mode of operation may comprise a Radio Resource Control connected mode of operation. The second mode of operation may comprise an RRC idle or an RRC inactive mode of operation. The base station may be configured to broadcast system information comprising at least one second CQD parameter. The wireless device may then utilize the at least one first CQD parameter and at least one second COD parameter as described above.

The first control message may comprise a timer associated with the at least one first CQD parameter. The first control message may comprise a cell list indicating in which cells the at least one first COD parameter may be used. The first control message may comprise a predefined number of cell re-selections that the wireless device may perform using the at least one first CQD parameter.

In some embodiments the base station may broadcast an indication instructing the wireless device to substitute using a subset of the at least one first CQD parameters for an equivalent subset of the at least one second CQD parameters.

The at least one first CQD may comprise one or more of: an indication of a maximum number of beams to be averaged when performing CQD; an indication of a threshold quality for beams to be used to estimate cell quality; an indication of a resource type to be used to determine cell quality; a synchronization signal block configuration; and a channel state information reference signal, CSI-RS, configuration.

In some examples, cell quality comprises one of more of: a reference signal received power, RSRP, a reference signal received quality RSRQ and/or a signal-to-interference-plus-noise ratio, SINR.

There is therefore provided methods and apparatus for performing cell measurements in a wireless device, and providing the wireless device with parameters enabling the wireless device to perform the measurements. In particular methods and apparatus disclosed herein maintain flexibility in providing parameters individually to wireless devices moving from a first mode of operation to a second mode of operation FIG. 2 illustrates a wireless network in accordance with some embodiments.

Figure 2:
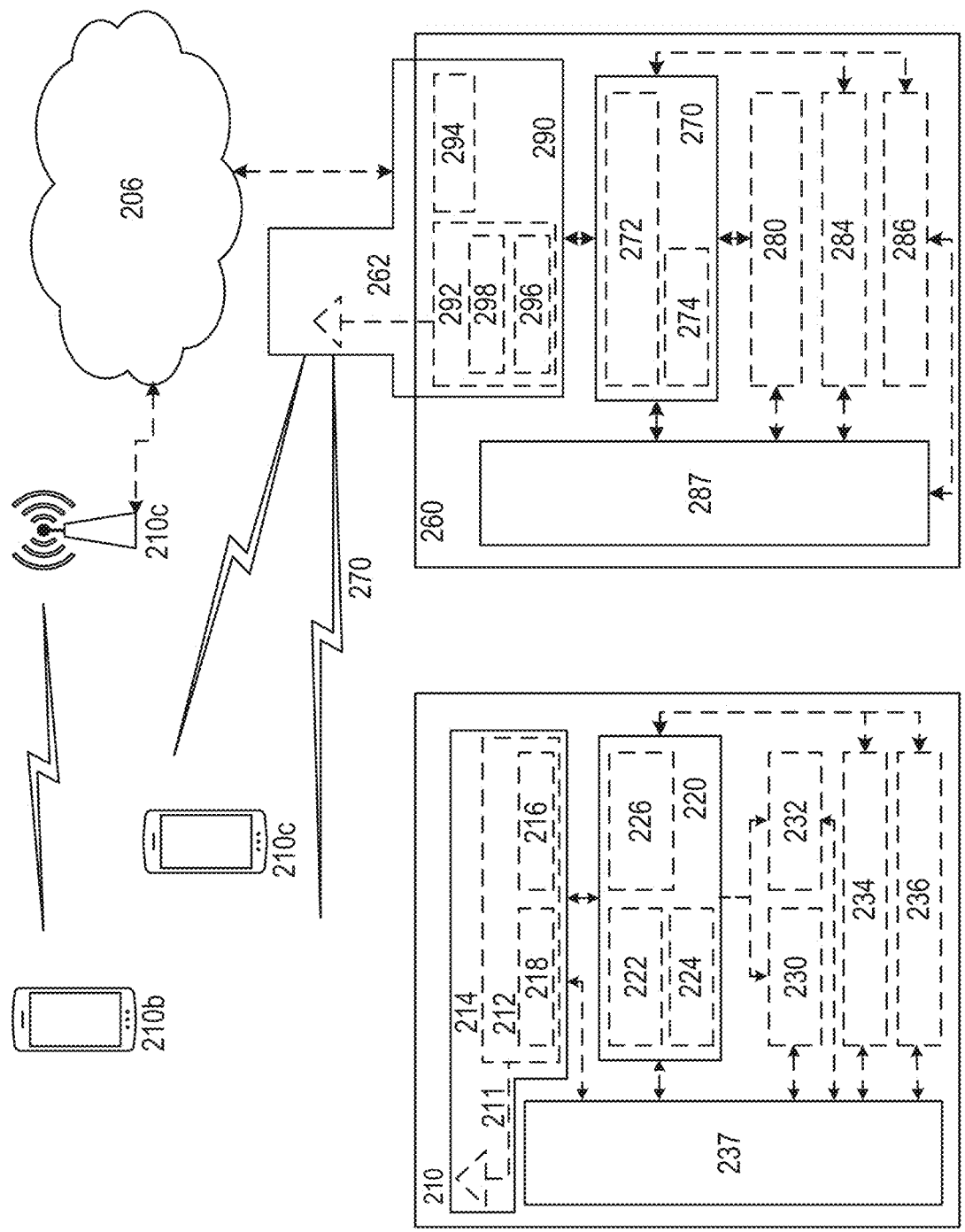
FIG. 2 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 206, network nodes 260 and 260b, and WDs 210, 210b, and 210c. For example, the WDs 210, 210b, and 210c may operate similarly to the wireless device or UE described previously. For example, the network nodes 260 and 260b may operate similarly to the base station described previously. In practice, a wireless network may further include any additional elements suitable to support communication between wireless devices or between a wireless device and another communication device, such as a landline telephone, a service provider, or any other network node or end device. Of the illustrated components, network node 260 and wireless device (WD) 210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system.

In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 260 and WD 210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 260 includes processing circuitry 270, device readable medium 280, interface 290, auxiliary equipment 284, power source 286, power circuitry 287, and antenna 262. Although network node 260 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 260 are depicted as single boxes located within a larger box, or nested within multiple boxes, in practice, a network node may comprise multiple different physical components that make up a single illustrated component (e.g., device readable medium 280 may comprise multiple separate hard drives as well as multiple RAM modules).

Similarly, network node 260 may be composed of multiple physically separate components (e.g., a NodeB component and a RNC component, or a BTS component and a BSC component, etc.), which may each have their own respective components. In certain scenarios in which network node 260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 260 may be configured to support multiple radio access technologies (RATs). In such embodiments, some components may be duplicated (e.g., separate device readable medium 280 for the different RATs) and some components may be reused (e.g., the same antenna 262 may be shared by the RATs). Network node 260 may also include multiple sets of the various illustrated components for different wireless technologies integrated into network node 260, such as, for example, GSM, WCDMA, LTE, NR, WiFi, or Bluetooth wireless technologies. These wireless technologies may be integrated into the same or different chip or set of chips and other components within network node 260.

Processing circuitry 270 is configured to perform any determining, calculating, or similar operations (e.g., certain obtaining operations) described herein as being provided by a network node. These operations performed by processing circuitry 270 may include processing information obtained by processing circuitry 270 by, for example, converting the obtained information into other information, comparing the obtained information or converted information to information stored in the network node, and/or performing one or more operations based on the obtained information or converted information, and as a result of said processing making a determination.

Processing circuitry 270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 260 components, such as device readable medium 280, network node 260 functionality. For example, processing circuitry 270 may execute instructions stored in device readable medium 280 or in memory within processing circuitry 270. Such functionality may include providing any of the various wireless features, functions, or benefits discussed herein. In some embodiments, processing circuitry 270 may include a system on a chip (SOC).

In some embodiments, processing circuitry 270 may include one or more of radio frequency (RF) transceiver circuitry 272 and baseband processing circuitry 274. In some embodiments, radio frequency (RF) transceiver circuitry 272 and baseband processing circuitry 274 may be on separate chips (or sets of chips), boards, or units, such as radio units and digital units. In alternative embodiments, part or all of RF transceiver circuitry 272 and baseband processing circuitry 274 may be on the same chip or set of chips, boards, or units In certain embodiments, some or all of the functionality described herein as being provided by a network node, base station, eNB or other such network device may be performed by processing circuitry 270 executing instructions stored on device readable medium 280 or memory within processing circuitry 270. In alternative embodiments, some or all of the functionality may be provided by processing circuitry 270 without executing instructions stored on a separate or discrete device readable medium, such as in a hard-wired manner. In any of those embodiments, whether executing instructions stored on a device readable storage medium or not, processing circuitry 270 can be configured to perform the described functionality. The benefits provided by such functionality are not limited to processing circuitry 270 alone or to other components of network node 260, but are enjoyed by network node 260 as a whole, and/or by end users and the wireless network generally.

Device readable medium 280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 270. Device readable medium 280 may store any suitable instructions, data or information, including a computer program, software, an application including one or more of logic, rules, code, tables, etc. and/or other instructions capable of being executed by processing circuitry 270 and, utilized by network node 260. Device readable medium 280 may be used to store any calculations made by processing circuitry 270 and/or any data received via interface 290. In some embodiments, processing circuitry 270 and device readable medium 280 may be considered to be integrated.

Interface 290 is used in the wired or wireless communication of signalling and/or data between network node 260, network 206, and/or WDs 210. As illustrated, interface 290 comprises port(s)/terminal(s) 294 to send and receive data, for example to and from network 206 over a wired connection. Interface 290 also includes radio front end circuitry 292 that may be coupled to, or in certain embodiments a part of, antenna 262. Radio front end circuitry 292 comprises filters 298 and amplifiers 296. Radio front end circuitry 292 may be connected to antenna 262 and processing circuitry 270. Radio front end circuitry may be configured to condition signals communicated between antenna 262 and processing circuitry 270. Radio front end circuitry 292 may receive digital data that is to be sent out to other network nodes or WDs via a wireless connection. Radio front end circuitry 292 may convert the digital data into a radio signal having the appropriate channel and bandwidth parameters using a combination of filters 298 and/or amplifiers 296. The radio signal may then be transmitted via antenna 262. Similarly, when receiving data, antenna 262 may collect radio signals which are then converted into digital data by radio front end circuitry 292. The digital data may be passed to processing circuitry 270. In other embodiments, the interface may comprise different components and/or different combinations of components.

In certain alternative embodiments, network node 260 may not include separate radio front end circuitry 292, instead, processing circuitry 270 may comprise radio front end circuitry and may be connected to antenna 262 without separate radio front end circuitry 292. Similarly, in some embodiments, all or some of RF transceiver circuitry 272 may be considered a part of interface 290. In still other embodiments, interface 290 may include one or more ports or terminals 294, radio front end circuitry 292, and RF transceiver circuitry 272, as part of a radio unit (not shown), and interface 290 may communicate with baseband processing circuitry 274, which is part of a digital unit (not shown).

Antenna 262 may include one or more antennas, or antenna arrays, configured to send and/or receive wireless signals. Antenna 262 may be coupled to radio front end circuitry 290 and may be any type of antenna capable of transmitting and receiving data and/or signals wirelessly. In some embodiments, antenna 262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 262 may be separate from network node 260 and may be connectable to network node 260 through an interface or port.

Antenna 262, interface 290, and/or processing circuitry 270 may be configured to perform any receiving operations and/or certain obtaining operations described herein as being performed by a network node. Any information, data and/or signals may be received from a wireless device, another network node and/or any other network equipment. Similarly, antenna 262, interface 290, and/or processing circuitry 270 may be configured to perform any transmitting operations described herein as being performed by a network node. Any information, data and/or signals may be transmitted to a wireless device, another network node and/or any other network equipment.

Power circuitry 287 may comprise, or be coupled to, power management circuitry and is configured to supply the components of network node 260 with power for performing the functionality described herein. Power circuitry 287 may receive power from power source 286. Power source 286 and/or power circuitry 287 may be configured to provide power to the various components of network node 260 in a form suitable for the respective components (e.g., at a voltage and current level needed for each respective component). Power source 286 may either be included in, or external to, power circuitry 287 and/or network node 260. For example, network node 260 may be connectable to an external power source (e.g., an electricity outlet) via an input circuitry or interface such as an electrical cable, whereby the external power source supplies power to power circuitry 287. As a further example, power source 286 may comprise a source of power in the form of a battery or battery pack which is connected to, or integrated in, power circuitry 287. The battery may provide backup power should the external power source fail. Other types of power sources, such as photovoltaic devices, may also be used.

Alternative embodiments of network node 260 may include additional components beyond those shown in FIG. 2 that may be responsible for providing certain aspects of the network node's functionality, including any of the functionality described herein and/or any functionality necessary to support the subject matter described herein. For example, network node 260 may include user interface equipment to allow input of information into network node 260 and to allow output of information from network node 260. This may allow a user to perform diagnostic, maintenance, repair, and other administrative functions for network node 260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 210 includes antenna 211, interface 214, processing circuitry 220, device readable medium 230, user interface equipment 232, auxiliary equipment 234, power source 236 and power circuitry 237. WD 210 may include multiple sets of one or more of the illustrated components for different wireless technologies supported by WD 210, such as, for example, GSM, WCDMA, LTE, NR, WiFi, WiMAX, or Bluetooth wireless technologies, just to mention a few. These wireless technologies may be integrated into the same or different chips or set of chips as other components within WD 210.

Antenna 211 may include one or more antennas or antenna arrays, configured to send and/or receive wireless signals, and is connected to interface 214. In certain alternative embodiments, antenna 211 may be separate from WD 210 and be connectable to WD 210 through an interface or port. Antenna 211, interface 214, and/or processing circuitry 220 may be configured to perform any receiving or transmitting operations described herein as being performed by a WD. Any information, data and/or signals may be received from a network node and/or another WD. In some embodiments, radio front end circuitry and/or antenna 211 may be considered an interface.

As illustrated, interface 214 comprises radio front end circuitry 212 and antenna 211. Radio front end circuitry 212 comprise one or more filters 218 and amplifiers 216. Radio front end circuitry 214 is connected to antenna 211 and processing circuitry 220, and is configured to condition signals communicated between antenna 211 and processing circuitry 220. Radio front end circuitry 212 may be coupled to or a part of antenna 211. In some embodiments, WD 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or WDs via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 210 components, such as device readable medium 230, WD 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments processing circuitry 220 of WD 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

In certain embodiments, some or all of the functionality described herein as being performed by a WD may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner. In any of those particular embodiments, whether executing instructions stored on a device readable storage medium or not, processing circuitry 220 can be configured to perform the described functionality. The benefits provided by such functionality are not limited to processing circuitry 220 alone or to other components of WD 210, but are enjoyed by WD 210 as a whole, and/or by end users and the wireless network generally.

Processing circuitry 220 may be configured to perform any determining, calculating, or similar operations (e.g., certain obtaining operations) described herein as being performed by a WD. These operations, as performed by processing circuitry 220, may include processing information obtained by processing circuitry 220 by, for example, converting the obtained information into other information, comparing the obtained information or converted information to information stored by WD 210, and/or performing one or more operations based on the obtained information or converted information, and as a result of said processing making a determination.

Device readable medium 230 may be operable to store a computer program, software, an application including one or more of logic, rules, code, tables, etc. and/or other instructions capable of being executed by processing circuitry 220. Device readable medium 230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 220. In some embodiments, processing circuitry 220 and device readable medium 230 may be considered to be integrated.

User interface equipment 232 may provide components that allow for a human user to interact with WD 210. Such interaction may be of many forms, such as visual, audial, tactile, etc. User interface equipment 232 may be operable to produce output to the user and to allow the user to provide input to WD 210. The type of interaction may vary depending on the type of user interface equipment 232 installed in WD 210. For example, if WD 210 is a smart phone, the interaction may be via a touch screen; if WD 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into WD 210, and is connected to processing circuitry 220 to allow processing circuitry 220 to process the input information. User interface equipment 232 may include, for example, a microphone, a proximity or other sensor, keys/buttons, a touch display, one or more cameras, a USB port, or other input circuitry. User interface equipment 232 is also configured to allow output of information from WD 210, and to allow processing circuitry 220 to output information from WD 210. User interface equipment 232 may include, for example, a speaker, a display, vibrating circuitry, a USB port, a headphone interface, or other output circuitry. Using one or more input and output interfaces, devices, and circuits, of user interface equipment 232, WD 210 may communicate with end users and/or the wireless network, and allow them to benefit from the functionality described herein.

Auxiliary equipment 234 is operable to provide more specific functionality which may not be generally performed by WDs. This may comprise specialized sensors for doing measurements for various purposes, interfaces for additional types of communication such as wired communications etc. The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. WD 210 may further comprise power circuitry 237 for delivering power from power source 236 to the various parts of WD 210 which need power from power source 236 to carry out any functionality described or indicated herein. Power circuitry 237 may in certain embodiments comprise power management circuitry. Power circuitry 237 may additionally or alternatively be operable to receive power from an external power source; in which case WD 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any formatting, converting, or other modification to the power from power source 236 to make the power suitable for the respective components of WD 210 to which power is supplied.

Figure 3:
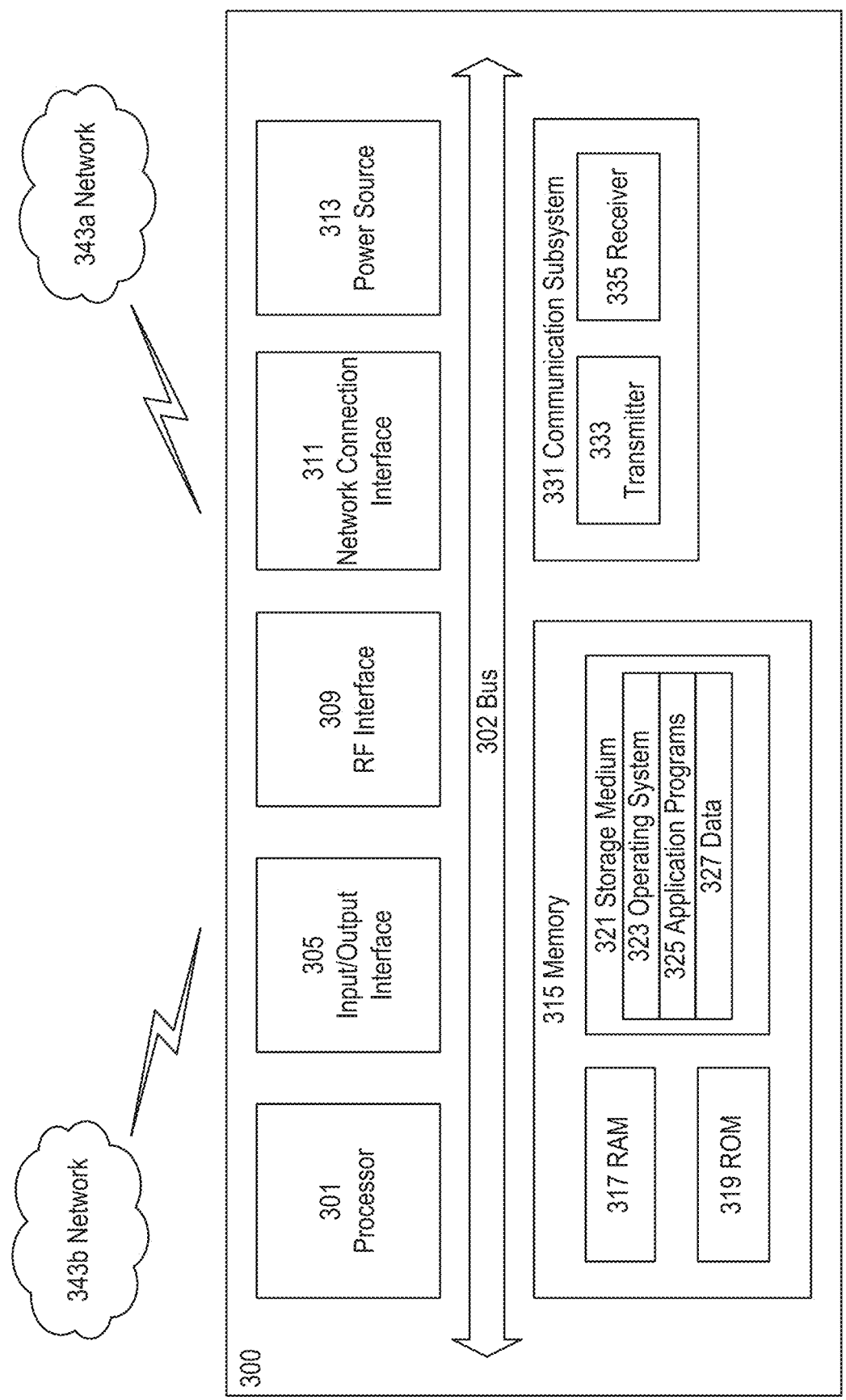
FIG. 3 illustrates a User Equipment in accordance with some embodiments.

FIG. 3 illustrates a User Equipment in accordance with some embodiments.

FIG. 3 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 3200 may be any UE identified by the $3^{rd}$ Generation Partnership Project (3GPP), including a NB-IoT UE, a machine type communication (MTC) UE, and/or an enhanced MTC (eMTC) UE. UE 300, as illustrated in FIG. 3, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 3 is a UE, the components discussed herein are equally applicable to a WD, and vice-versa. The UE 300 may comprise a wireless device or UE as described with respect to any of the examples and embodiments above.

In FIG. 3, UE 300 includes processing circuitry 301 that is operatively coupled to input/output interface 305, radio frequency (RF) interface 309, network connection interface 311, memory 315 including random access memory (RAM) 317, read-only memory (ROM) 319, and storage medium 321 or the like, communication subsystem 331, power source 333, and/or any other component, or any combination thereof. Storage medium 321 includes operating system 323, application program 325, and data 327. In other embodiments, storage medium 321 may include other similar types of information. Certain UEs may utilize all of the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 301 may be configured to process computer instructions and data. Processing circuitry 301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 301 may include two central processing units (CPUs). Data may be information in a form suitable for use by a computer.

In the depicted embodiment, input/output interface 305 may be configured to provide a communication interface to an input device, output device, or input and output device. UE 300 may be configured to use an output device via input/output interface 305. An output device may use the same type of interface port as an input device. For example, a USB port may be used to provide input to and output from UE 300. The output device may be a speaker, a sound card, a video card, a display, a monitor, a printer, an actuator, an emitter, a smartcard, another output device, or any combination thereof. UE 300 may be configured to use an input device via input/output interface 305 to allow a user to capture information into UE 300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 309 may be configured to provide a communication interface to RF components such as a transmitter, a receiver, and an antenna. Network connection interface 311 may be configured to provide a communication interface to network 343a. Network 343a may encompass wired and/or wireless networks such as a local-area network (LAN), a wide-area network (WAN), a computer network, a wireless network, a telecommunications network, another like network or any combination thereof. For example, network 343a may comprise a Wi-Fi network. Network connection interface 311 may be configured to include a receiver and a transmitter interface used to communicate with one or more other devices over a communication network according to one or more communication protocols, such as Ethernet, TCP/IP, SONET, ATM, or the like. Network connection interface 311 may implement receiver and transmitter functionality appropriate to the communication network links (e.g., optical, electrical, and the like). The transmitter and receiver functions may share circuit components, software or firmware, or alternatively may be implemented separately.

RAM 317 may be configured to interface via bus 302 to processing circuitry 301 to provide storage or caching of data or computer instructions during the execution of software programs such as the operating system, application programs, and device drivers. ROM 319 may be configured to provide computer instructions or data to processing circuitry 301. For example, ROM 319 may be configured to store invariant low-level system code or data for basic system functions such as basic input and output (I/O), startup, or reception of keystrokes from a keyboard that are stored in a non-volatile memory. Storage medium 321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 321 may be configured to include operating system 323, application program 325 such as a web browser application, a widget or gadget engine or another application, and data file 327. Storage medium 321 may store, for use by UE 300, any of a variety of various operating systems or combinations of operating systems.

Storage medium 321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 321 may allow UE 300 to access computer-executable instructions, application programs or the like, stored on transitory or non-transitory memory media, to off-load data, or to upload data. An article of manufacture, such as one utilizing a communication system may be tangibly embodied in storage medium 321, which may comprise a device readable medium.

In FIG. 3, processing circuitry 301 may be configured to communicate with network 343b using communication subsystem 331. Network 343a and network 343b may be the same network or networks or different network or networks. Communication subsystem 331 may be configured to include one or more transceivers used to communicate with network 343b. For example, communication subsystem 331 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 333 and/or receiver 335 to implement transmitter or receiver functionality, respectively, appropriate to the RAN links (e.g., frequency allocations and the like). Further, transmitter 333 and receiver 335 of each transceiver may share circuit components, software or firmware, or alternatively may be implemented separately.

In the illustrated embodiment, the communication functions of communication subsystem 331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 331 may include cellular communication, Wi-Fi communication, Bluetooth communication, and GPS communication. Network 343b may encompass wired and/or wireless networks such as a local-area network (LAN), a wide-area network (WAN), a computer network, a wireless network, a telecommunications network, another like network or any combination thereof. For example, network 343b may be a cellular network, a Wi-Fi network, and/or a near-field network. Power source 313 may be configured to provide alternating current (AC) or direct current (DC) power to components of UE 300.

The features, benefits and/or functions described herein may be implemented in one of the components of UE 300 or partitioned across multiple components of UE 300. Further, the features, benefits, and/or functions described herein may be implemented in any combination of hardware, software or firmware. In one example, communication subsystem 331 may be configured to include any of the components described herein. Further, processing circuitry 301 may be configured to communicate with any of such components over bus 302. In another example, any of such components may be represented by program instructions stored in memory that when executed by processing circuitry 301 perform the corresponding functions described herein. In another example, the functionality of any of such components may be partitioned between processing circuitry 301 and communication subsystem 331. In another example, the non-computationally intensive functions of any of such components may be implemented in software or firmware and the computationally intensive functions may be implemented in hardware.

Figure 4:
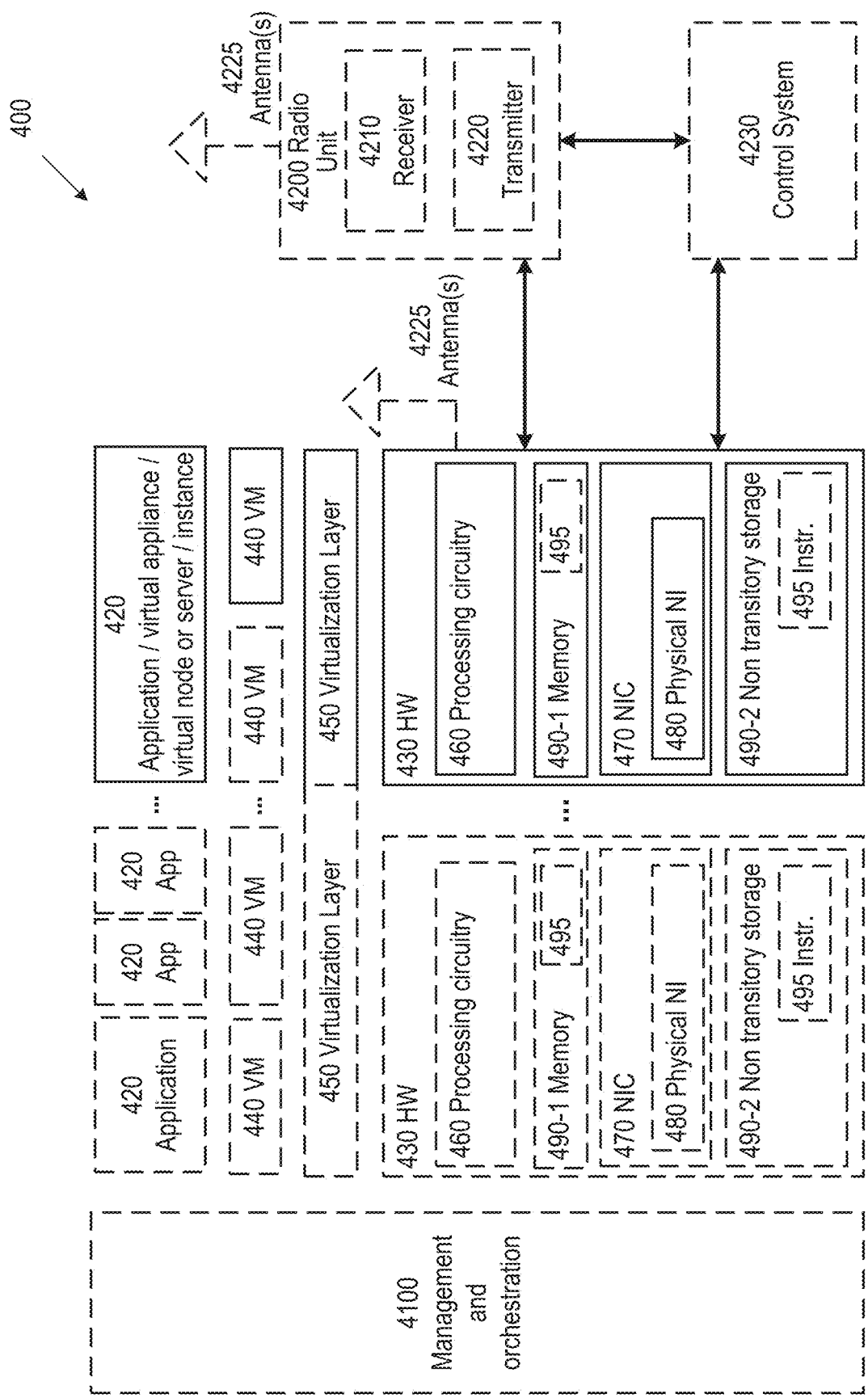
FIG. 4 illustrates a virtualization environment in accordance with some embodiments.

FIG. 4 illustrates a virtualization environment in accordance with some embodiments.

FIG. 4 is a schematic block diagram illustrating a virtualization environment 400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 400 hosted by one or more of hardware nodes 430. Further, in embodiments in which the virtual node is not a radio access node or does not require radio connectivity (e.g., a core network node), then the network node may be entirely virtualized.

The functions may be implemented by one or more applications 420 (which may alternatively be called software instances, virtual appliances, network functions, virtual nodes, virtual network functions, etc.) operative to implement some of the features, functions, and/or benefits of some of the embodiments disclosed herein. Applications 420 are run in virtualization environment 400 which provides hardware 430 comprising processing circuitry 460 and memory 490. Memory 490 contains instructions 495 executable by processing circuitry 460 whereby application 420 is operative to provide one or more of the features, benefits, and/or functions disclosed herein.

Virtualization environment 400, comprises general-purpose or special-purpose network hardware devices 430 comprising a set of one or more processors or processing circuitry 460, which may be commercial off-the-shelf (COTS) processors, dedicated Application Specific Integrated Circuits (ASICs), or any other type of processing circuitry including digital or analog hardware components or special purpose processors. Each hardware device may comprise memory 490-1 which may be non-persistent memory for temporarily storing instructions 495 or software executed by processing circuitry 460. Each hardware device may comprise one or more network interface controllers (NICs) 470, also known as network interface cards, which include physical network interface 480. Each hardware device may also include non-transitory, persistent, machine-readable storage media 490-2 having stored therein software 495 and/or instructions executable by processing circuitry 460. Software 495 may include any type of software including software for instantiating one or more virtualization layers 450 (also referred to as hypervisors), software to execute virtual machines 440 as well as software allowing it to execute functions, features and/or benefits described in relation with some embodiments described herein.

Virtual machines 440, comprise virtual processing, virtual memory, virtual networking or interface and virtual storage, and may be run by a corresponding virtualization layer 450 or hypervisor. Different embodiments of the instance of virtual appliance 420 may be implemented on one or more of virtual machines 440, and the implementations may be made in different ways.

During operation, processing circuitry 460 executes software 495 to instantiate the hypervisor or virtualization layer 450, which may sometimes be referred to as a virtual machine monitor (VMM). Virtualization layer 450 may present a virtual operating platform that appears like networking hardware to virtual machine 440.

As shown in FIG. 4, hardware 430 may be a standalone network node with generic or specific components. Hardware 430 may comprise antenna 4225 and may implement some functions via virtualization. Alternatively, hardware 430 may be part of a larger cluster of hardware (e.g. such as in a data center or customer premise equipment (CPE)) where many hardware nodes work together and are managed via management and orchestration (MANO) 4100, which, among others, oversees lifecycle management of applications 420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 440 may be a software implementation of a physical machine that runs programs as if they were executing on a physical, non-virtualized machine. Each of virtual machines 440, and that part of hardware 430 that executes that virtual machine, be it hardware dedicated to that virtual machine and/or hardware shared by that virtual machine with others of the virtual machines 440, forms a separate virtual network elements (VNE).

Still in the context of NFV, Virtual Network Function (VNF) is responsible for handling specific network functions that run in one or more virtual machines 440 on top of hardware networking infrastructure 430 and corresponds to application 420 in FIG. 4.

In some embodiments, one or more radio units 4200 that each include one or more transmitters 4220 and one or more receivers 4210 may be coupled to one or more antennas 4225. Radio units 4200 may communicate directly with hardware nodes 430 via one or more appropriate network interfaces and may be used in combination with the virtual components to provide a virtual node with radio capabilities, such as a radio access node or a base station.

In some embodiments, some signalling can be effected with the use of control system 4230 which may alternatively be used for communication between the hardware nodes 430 and radio units 4200.

Figure 5:
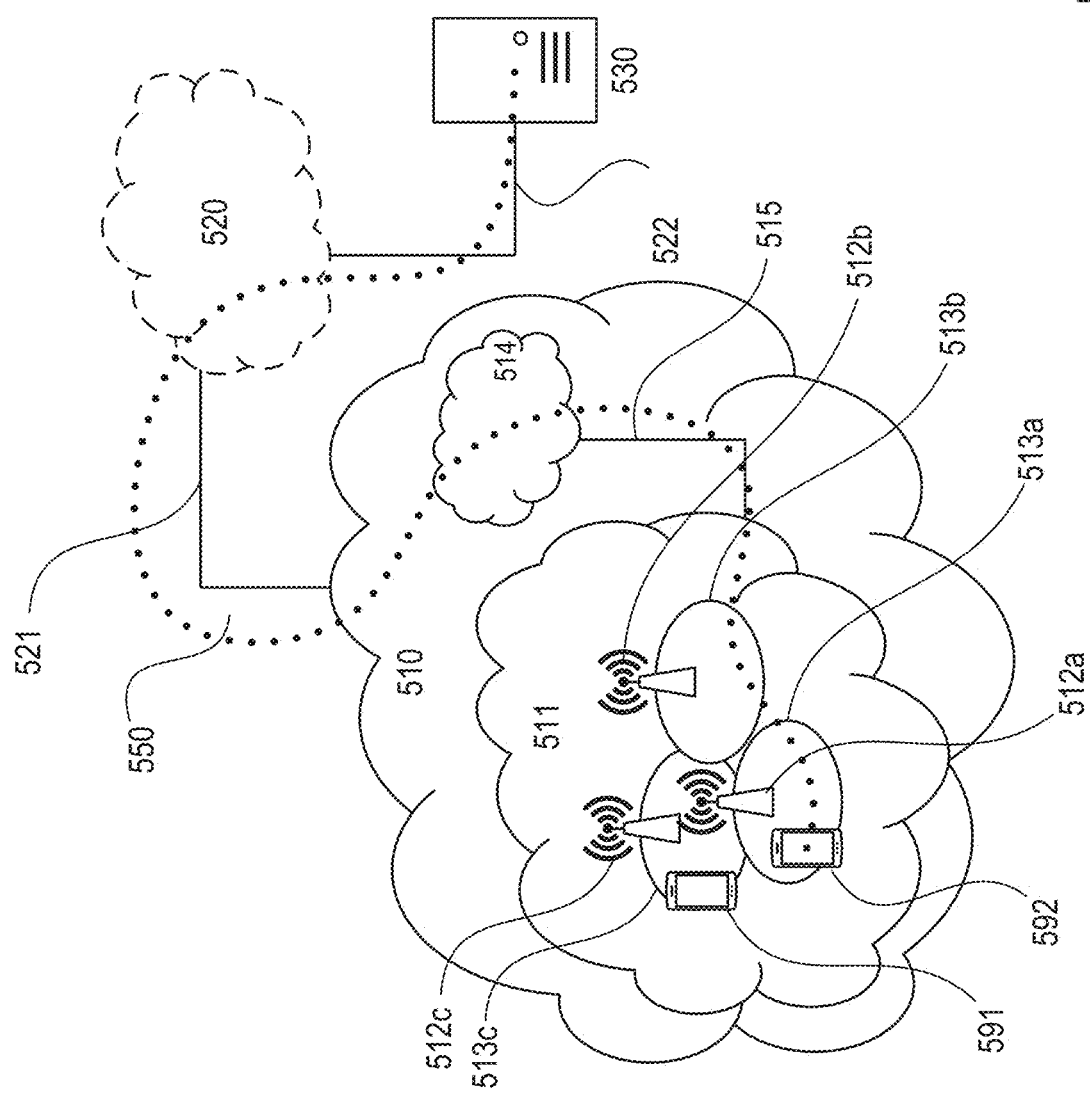
FIG. 5 illustrates a telecommunication network connected via an intermediate network to a host computer in accordance with some embodiments.

FIG. 5 illustrates a telecommunication network connected via an intermediate network to a host computer in accordance with some embodiments.

With reference to FIG. 5, in accordance with an embodiment, a communication system includes telecommunication network 510, such as a 3GPP-type cellular network, which comprises access network 511, such as a radio access network, and core network 514. Access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to core network 514 over a wired or wireless connection 515. Each base station 512a, 512b, 512c may be configured to operate as described with respect to any of the base stations in the embodiments above. A first UE 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512. Each of the UEs 591, 592 may be configured to operate as described with respect to any of the UEs or wireless devices in the embodiments above.

Telecommunication network 510 is itself connected to host computer 530, which may be embodied in the hardware and/or software of a standalone server, a cloud-implemented server, a distributed server or as processing resources in a server farm. Host computer 530 may be under the ownership or control of a service provider, or may be operated by the service provider or on behalf of the service provider. Connections 521 and 522 between telecommunication network 510 and host computer 530 may extend directly from core network 514 to host computer 530 or may go via an optional intermediate network 520. Intermediate network 520 may be one of, or a combination of more than one of, a public, private or hosted network; intermediate network 520, if any, may be a backbone network or the Internet; in particular, intermediate network 520 may comprise two or more sub-networks (not shown).

The communication system of FIG. 5 as a whole enables connectivity between the connected UEs 591, 592 and host computer 530. The connectivity may be described as an over-the-top (OTT) connection 550. Host computer 530 and the connected UEs 591, 592 are configured to communicate data and/or signaling via OTT connection 550, using access network 511, core network 514, any intermediate network 520 and possible further infrastructure (not shown) as intermediaries. OTT connection 550 may be transparent in the sense that the participating communication devices through which OTT connection 550 passes are unaware of routing of uplink and downlink communications. For example, base station 512 may not or need not be informed about the past routing of an incoming downlink communication with data originating from host computer 530 to be forwarded (e.g., handed over) to a connected UE 591. Similarly, base station 512 need not be aware of the future routing of an outgoing uplink communication originating from the UE 591 towards the host computer 530.

Figure 6:
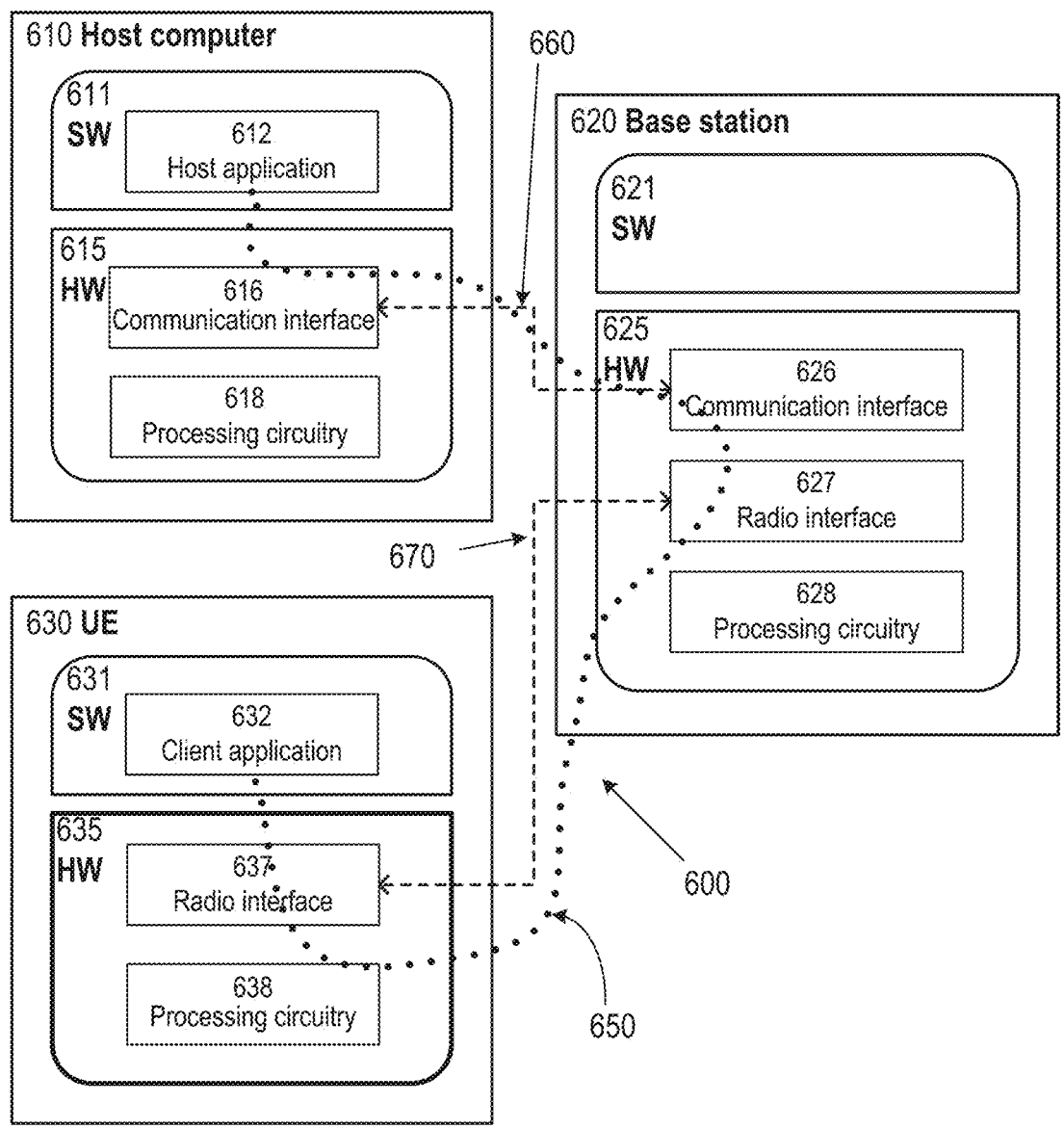
FIG. 6 illustrates a host computer communicating via a base station with a user equipment over a partially wireless connection in accordance with some embodiments.

FIG. 6 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 6. In communication system 600, host computer 610 comprises hardware 615 including communication interface 616 configured to set up and maintain a wired or wireless connection with an interface of a different communication device of communication system 600. Host computer 610 further comprises processing circuitry 618, which may have storage and/or processing capabilities. In particular, processing circuitry 618 may comprise one or more programmable processors, application-specific integrated circuits, field programmable gate arrays or combinations of these (not shown) adapted to execute instructions. Host computer 610 further comprises software 611, which is stored in or accessible by host computer 610 and executable by processing circuitry 618. Software 611 includes host application 612. Host application 612 may be operable to provide a service to a remote user, such as UE 630 connecting via OTT connection 650 terminating at UE 630 and host computer 610. In providing the service to the remote user, host application 612 may provide user data which is transmitted using OTT connection 650.

Communication system 600 further includes base station 620 provided in a telecommunication system and comprising hardware 625 enabling it to communicate with host computer 610 and with UE 630. Hardware 625 may include communication interface 626 for setting up and maintaining a wired or wireless connection with an interface of a different communication device of communication system 600, as well as radio interface 627 for setting up and maintaining at least wireless connection 670 with UE 630 located in a coverage area (not shown in FIG. 6) served by base station 620. Communication interface 626 may be configured to facilitate connection 660 to host computer 610. Connection 660 may be direct or it may pass through a core network (not shown in FIG. 6) of the telecommunication system and/or through one or more intermediate networks outside the telecommunication system. In the embodiment shown, hardware 625 of base station 620 further includes processing circuitry 628, which may comprise one or more programmable processors, application-specific integrated circuits, field programmable gate arrays or combinations of these (not shown) adapted to execute instructions. Base station 620 further has software 621 stored internally or accessible via an external connection.

Communication system 600 further includes UE 630 already referred to. Its hardware 635 may include radio interface 637 configured to set up and maintain wireless connection 670 with a base station serving a coverage area in which UE 630 is currently located. Hardware 635 of UE 630 further includes processing circuitry 638, which may comprise one or more programmable processors, application-specific integrated circuits, field programmable gate arrays or combinations of these (not shown) adapted to execute instructions. UE 630 further comprises software 631, which is stored in or accessible by UE 630 and executable by processing circuitry 638. Software 631 includes client application 632. Client application 632 may be operable to provide a service to a human or non-human user via UE 630, with the support of host computer 610. In host computer 610, an executing host application 612 may communicate with the executing client application 632 via OTT connection 650 terminating at UE 630 and host computer 610. In providing the service to the user, client application 632 may receive request data from host application 612 and provide user data in response to the request data. OTT connection 650 may transfer both the request data and the user data. Client application 632 may interact with the user to generate the user data that it provides.

It is noted that host computer 610, base station 620 and UE 630 illustrated in FIG. 6 may be similar or identical to host computer 530, one of base stations 512*a*, 512*b*. 512*c* and one of UEs 591, 592 of FIG. 5, respectively. This is to say, the inner workings of these entities may be as shown in FIG. 6 and independently, the surrounding network topology may be that of FIG. 5.

In FIG. 6, OTT connection 650 has been drawn abstractly to illustrate the communication between host computer 610 and UE 630 via base station 620, without explicit reference to any intermediary devices and the precise routing of messages via these devices. Network infrastructure may determine the routing, which it may be configured to hide from UE 630 or from the service provider operating host computer 610, or both. While OTT connection 650 is active, the network infrastructure may further take decisions by which it dynamically changes the routing (e.g., on the basis of load balancing consideration or reconfiguration of the network).

Wireless connection 670 between UE 630 and base station 620 is in accordance with the teachings of the embodiments described throughout this disclosure. One or more of the various embodiments improve the performance of OTT services provided to UE 630 using OTT connection 650, in which wireless connection 670 forms the last segment. More precisely, the teachings of these embodiments may improve the flexibility of cell-reselection in wireless devices transitioning between nodes, and thereby provide benefits such as avoiding cell reselection immediately after changing from one mode to another.

A measurement procedure may be provided for the purpose of monitoring data rate, latency and other factors on which the one or more embodiments improve. There may further be an optional network functionality for reconfiguring OTT connection 650 between host computer 610 and UE 630, in response to variations in the measurement results. The measurement procedure and/or the network functionality for reconfiguring OTT connection 650 may be implemented in software 611 and hardware 615 of host computer 610 or in software 631 and hardware 635 of UE 630, or both. In embodiments, sensors (not shown) may be deployed in or in association with communication devices through which OTT connection 650 passes; the sensors may participate in the measurement procedure by supplying values of the monitored quantities exemplified above, or supplying values of other physical quantities from which software 611, 631 may compute or estimate the monitored quantities. The reconfiguring of OTT connection 650 may include message format, retransmission settings, preferred routing etc.; the reconfiguring need not affect base station 620, and it may be unknown or imperceptible to base station 620. Such procedures and functionalities may be known and practiced in the art. In certain embodiments, measurements may involve proprietary UE signaling facilitating host computer 610's measurements of throughput, propagation times, latency and the like. The measurements may be implemented in that software 611 and 631 causes messages to be transmitted, in particular empty or 'dummy' messages, using OTT connection 650 while it monitors propagation times, errors etc.

Figure 7:
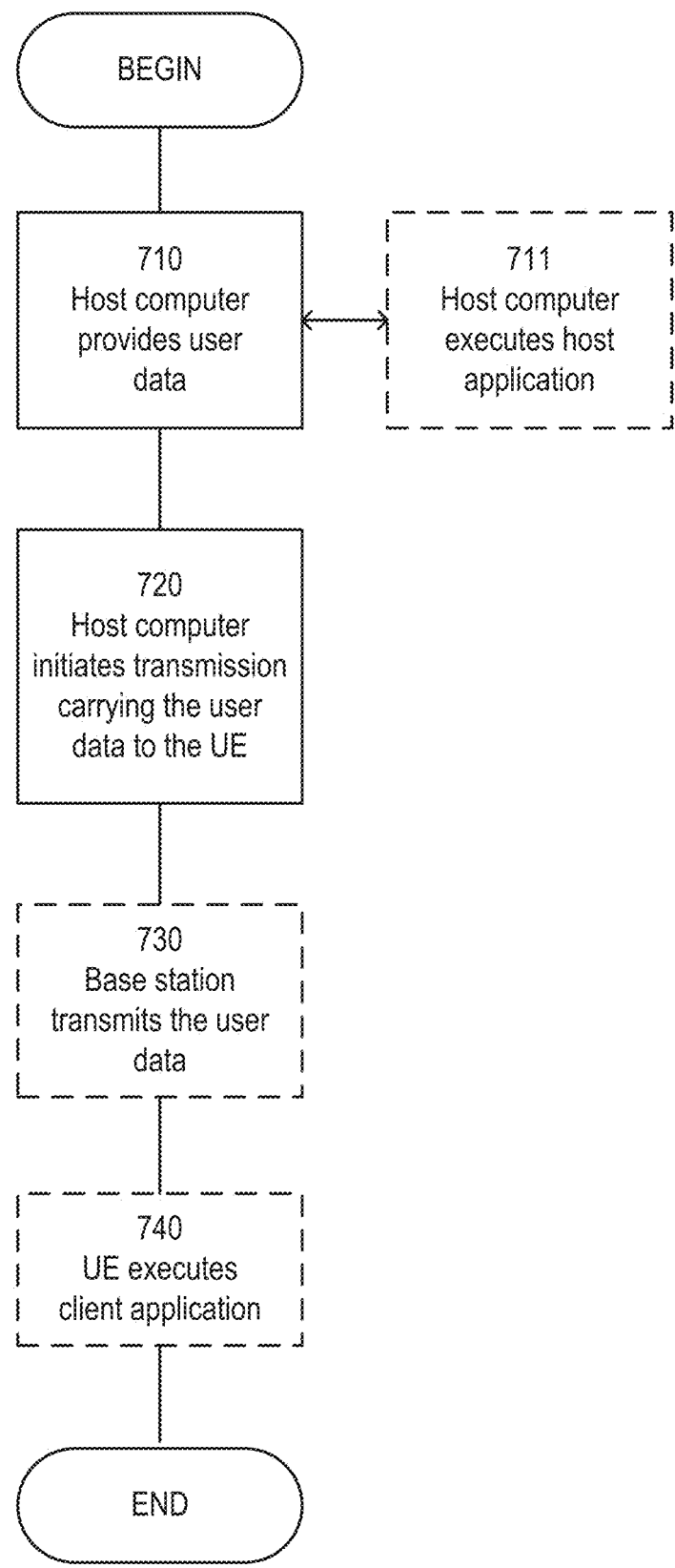
FIG. 7 illustrates methods implemented in a communication system including a host computer, a base station and a user equipment in accordance with some embodiments.

FIG. 7 illustrates methods implemented in a communication system including a host computer, a base station and a user equipment in accordance with some embodiments.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In step 710, the host computer provides user data. In substep 711 (which may be optional) of step 710, the host computer provides the user data by executing a host application. In step 720, the host computer initiates a transmission carrying the user data to the UE. In step 730 (which may be optional), the base station transmits to the UE the user data which was carried in the transmission that the host computer initiated, in accordance with the teachings of the embodiments described throughout this disclosure. In step 740 (which may also be optional), the UE executes a client application associated with the host application executed by the host computer.

Figure 8:
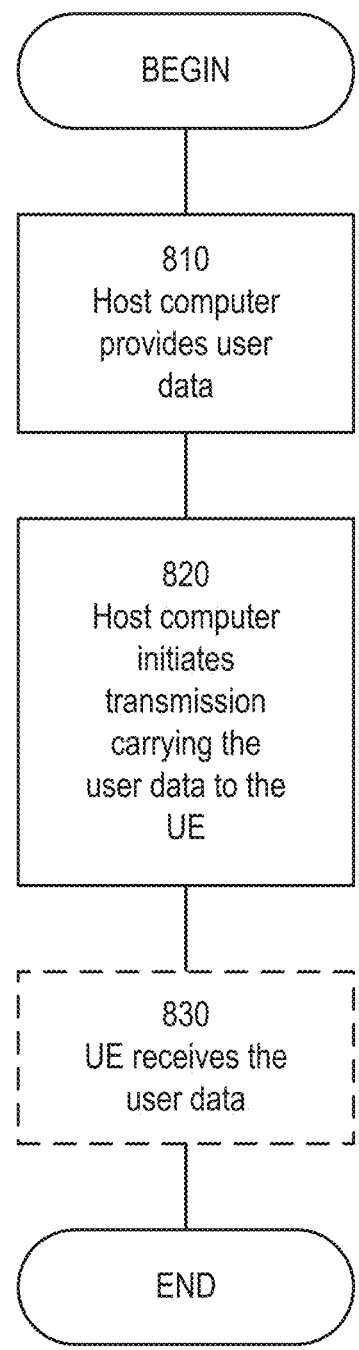
FIG. 8 illustrates methods implemented in a communication system including a host computer, a base station and a user equipment in accordance with some embodiments.

FIG. 8 illustrates methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In step 810 of the method, the host computer provides user data. In an optional substep (not shown) the host computer provides the user data by executing a host application. In step 820, the host computer initiates a transmission carrying the user data to the UE. The transmission may pass via the base station, in accordance with the teachings of the embodiments described throughout this disclosure. In step 830 (which may be optional), the UE receives the user data carried in the transmission.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 9:
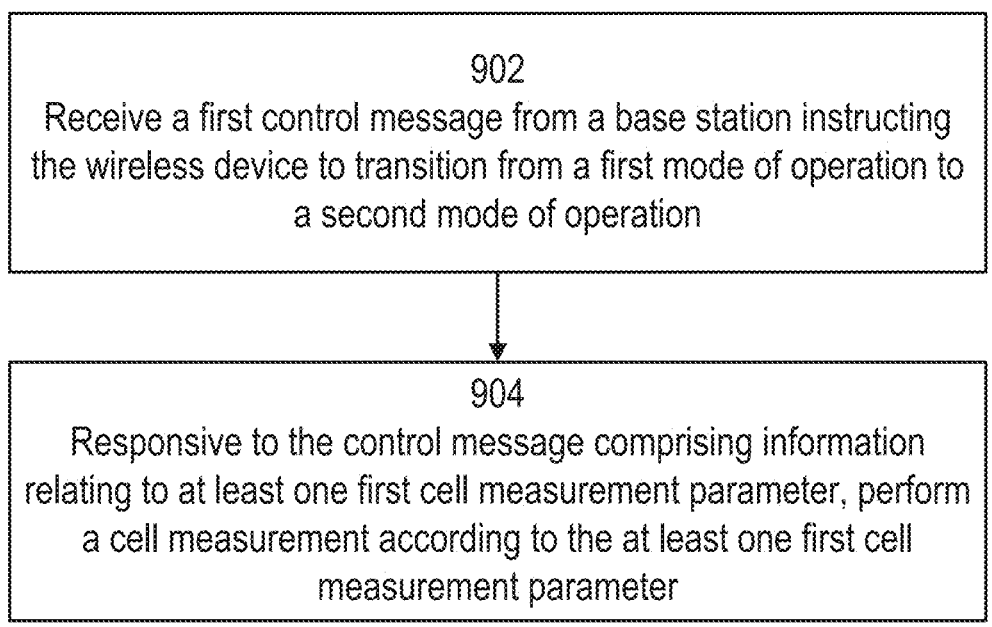
FIG. 9 illustrates a method in accordance with some embodiments.

FIG. 9 illustrates a method in accordance with some embodiments.

FIG. 9 depicts a method in accordance with particular embodiments, the method begins at step 902 with receiving a first control message from a base station instructing the wireless device to transition from a first mode of operation to a second mode of operation. In step 904 the method comprises responsive to the control message comprising information relating to at least one first cell measurement parameter, performing a cell measurement according to the at least one first cell measurement parameter FIG. 10 illustrates a virtualization apparatus in accordance with some embodiments.

Figure 10:
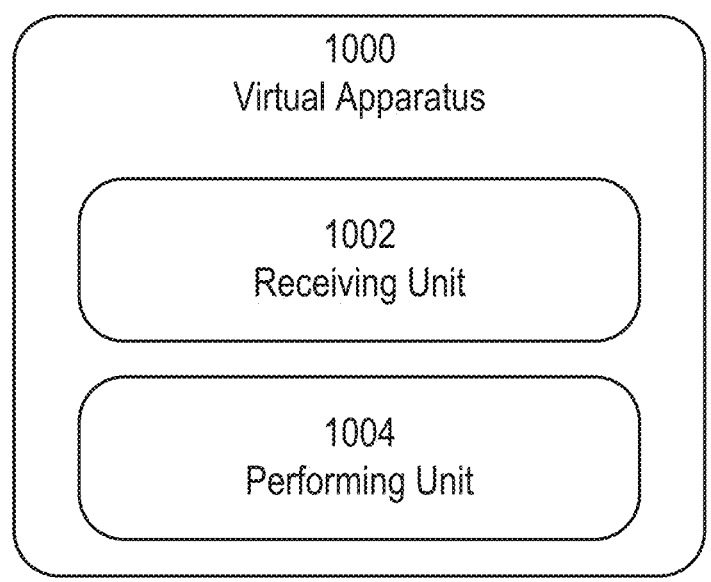
FIG. 10 illustrates a virtualization apparatus in accordance with some embodiments.

FIG. 10 illustrates a schematic block diagram of an apparatus 1000 in a wireless network (for example, the wireless network shown in FIG. 2). The apparatus may be implemented in a wireless device or network node (e.g., wireless device 210 shown in FIG. 2). Apparatus 1000 is operable to carry out the example method described with reference to FIG. 9 and possibly any other processes or methods disclosed herein. It is also to be understood that the method of FIG. 9 is not necessarily carried out solely by apparatus 1000. At least some operations of the method can be performed by one or more other entities.

Virtual Apparatus 1000 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc.

Program code stored in memory includes program instructions for executing one or more telecommunications and/or data communications protocols as well as instructions for carrying out one or more of the techniques described herein, in several embodiments. In some implementations, the processing circuitry may be used to cause Receiving unit 1002 and performing unit 1004 and any other suitable units of apparatus 1000 to perform corresponding functions according one or more embodiments of the present disclosure.

As illustrated in FIG. 10, apparatus 1000 includes Receiving unit 1002 and performing unit 1004; receiving unit 1002 is configured to receive a first control message from a base station instructing the wireless device to transition from a first mode of operation to a second mode of operation. Performing unit 1004 is configured to responsive to the control message comprising information relating to at least one first cell measurement parameter, perform a cell measurement according to the at least one first cell measurement parameter.

FIG. 11 illustrates a method in accordance with some embodiments.

FIG. 11 depicts a method in accordance with particular embodiments, the method begins at step 1102 with transmitting a first control message to the wireless device instructing the wireless device to transition from a first mode of operation to a second mode of operation, wherein the control message comprises information relating to at least one first cell measurement parameter for use by the wireless device in performing cell measurements whilst in the second mode of operation.

Figure 12:
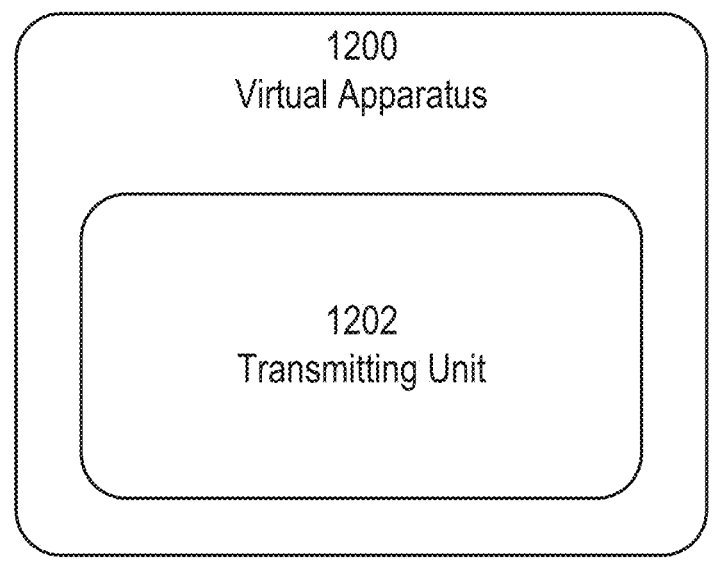
FIG. 12 illustrates a virtualization apparatus in accordance with some embodiments.

FIG. 12 illustrates a Virtualization apparatus in accordance with some embodiments.

FIG. 12 illustrates a schematic block diagram of an apparatus 1200 in a wireless network (for example, the wireless network shown in FIG. 2). The apparatus may be implemented in a wireless device or network node (e.g., network node illustrated in FIG. 2). Apparatus 1200 is operable to carry out the example method described with reference to FIG. 11 and possibly any other processes or methods disclosed herein. It is also to be understood that the method of FIG. 11 is not necessarily carried out solely by apparatus 1200. At least some operations of the method can be performed by one or more other entities.

Virtual Apparatus 1200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Transmitting 1202 and any other suitable units of apparatus 1200 to perform corresponding functions according one or more embodiments of the present disclosure.

As illustrated in FIG. 12, apparatus 1200 includes Transmitting unit 1202. Transmitting unit 1202 is configured to transmit a first control message to the wireless device instructing the wireless device to transition from a first mode of operation to a second mode of operation, wherein the control message comprises information relating to at least one first cell measurement parameter for use by the wireless device in performing cell measurements whilst in the second mode of operation.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Embodiments

Group A Embodiments

1. A method performed by a wireless device for performing a cell measurement, the method comprising:
   a. receiving a first control message from a base station instructing the wireless device to transition from a first mode of operation to a second mode of operation; and
   b. responsive to the control message comprising information relating to at least one first cell measurement parameter, performing a cell measurement according to the at least one first cell measurement parameter.
2. The method as in embodiment 1 wherein the at least one first measurement parameter comprises at least one first cell quality derivation, COD, parameter for use in determining cell quality based on beamformed reference signals.
3. The method as in embodiment 2 wherein the at least one COD parameter may be associated with one or more frequencies, one or more cell(s) or one or more frequencies each associated with one or more cells.
4. The method as in embodiment 2 or 3 wherein the cell measurement comprises determining a cell quality of one or more cells from which the wireless device is receiving beamformed reference signals.
5. The method as in embodiment 4 wherein the beamformed reference signals comprise one or more of synchronization signal blocks, SSB, Physical Broadcast Channel, PBCH, blocks and Chanel Status Information Reference Signals, CSI-RS.
6. The method of embodiment 4 or 5 wherein the first mode of operation is associated with a first level of signaling overhead and the second mode of operation is associated with a second level of signaling overhead which is less that the first level of signaling overhead.
7. The method of embodiment 4 or 5 wherein the first mode of operation is optimized for uplink and downlink data transmission and the second mode of operation is optimized to minimize power consumption of the wireless device.
8. The method of any one of embodiments 4 to 7 wherein the first mode of operation comprises a Radio Resource Control, RRC, connected mode of operation.
9. The method as in embodiment 8 wherein the second mode of operation comprises an RRC idle or an RRC inactive mode of operation.
10. The method of any one or embodiments 4 to 9 further comprising receiving broadcast system information comprising at least one second CQD parameter.
11. The method of embodiment 10 further comprising the step of responsive, to the first control message not comprising information relating to the at least one first CQD parameter, determining cell quality according to the at least one second CQD parameter.

12. The method of embodiment 10 or 11 further comprising, responsive to the first control message comprising a timer associated with the at least one first CQD parameter, starting the timer upon receipt of the control message;
    a. determining cell quality according to the at least one first CQD parameter until the timer expires; and
    b. determining cell quality according to the at least one second COD parameter after the timer has expired.

13. The method of anyone of embodiments 10 to 12 further comprising:
    a. responsive to the wireless device performing cell reselection to a cell in which cell reselection rules are associated with a resource type which is not configured in the at least one first CQD parameter, determining cell quality according to the at least one second CQD parameter.

14. The method of embodiment 13 wherein the resource type comprises a reference signal type, frequency or frequency band, and/or measurement quantity.

15. The method of any one of embodiments 10 to 14 further comprising; receiving the first control message whilst the wireless device is located with a first radio access network notification area, RNA; and
    a. responsive to the wireless device moving from the first RNA to a second RNA, determining cell quality according to the at least one second CQD parameter.

16. The method of any one of embodiments 10 to 14 further comprising, receiving the first control message whilst the wireless device is being served by a first cell, and
    a. responsive to the wireless device handing over from the first cell to a second cell, wherein the second cell is not a cell on a predetermined cell list, determining cell quality according to the at least one second CQD parameter.

17. The method as in embodiment 16 wherein the first control message comprises information relating to the cell list.

18. The method as in embodiment 16 wherein the cell list comprises only the first cell.

19. The method as in any one of embodiments 10 to 18 wherein responsive to the wireless device performing a predefined number of cell re-selections, determining cell quality according to the at least one second CQN parameter.

20. The method as in embodiment 17 wherein the first control message comprising information relating to the predefined number of cell re-selections.

21. The method as in embodiment 10 to 20 further comprising,
    a. responsive to receiving a broadcast indication instructing the wireless device to substitute using a subset of the at least one first CQD parameters for an equivalent subset of the at least one second CQD parameters;
    b. determining cell quality based on the equivalent subset of the at least one second CQD parameters.

22. The method as in embodiment 10 to 21 wherein the at least one first CQD parameter comprises a channel state information reference signal, CSI-RS, configuration, the method further comprises;
    a. responsive to the wireless device handing over to a base station which indicates that CSI-RS configurations are not used to perform cell re-selection, determining cell quality based on the at least second CQD parameter.

23. The method as in embodiment 10 to 21 wherein the at least one first CQD parameter comprises a synchronization signal block, SSB, configuration, the method further comprises;
    a. responsive to the wireless device handing over to a base station which indicates that SSB configurations are not used to perform cell re-selection, determining cell quality based on the at least second CQD parameter.

24. The method of any one of embodiments 4 to 23 further comprising, responsive to receiving a second control message instructing the wireless device to transition from the second mode of operation back to the first mode of operation, determining cell quality according to at least one third CQD parameter received during the first mode of operation or a pre-defined default rule indicating how to determine cell quality when the UE enters the first mode of operation.

25. The method as in any one of embodiments 4 to 24 wherein the at least one first CQD comprising one or more of: an indication of a maximum number of beams to be averaged when performing CQD; an indication of a threshold quality for beams to be used to estimate cell quality; an indication of a resource type to be used to determine cell quality; a synchronization signal block configuration; and a channel state information reference signal, CSI-RS, configuration.

26. The method as claimed in any one of embodiments 4 to 25 wherein cell quality comprises one of more of: a reference signal received power, RSRP, a reference signal received quality RSRQ and/or a signal-to-interference-plus-noise ratio, SINR.

27. The method of any of the previous embodiments, further comprising:
    providing user data; and
    forwarding the user data to a host computer via the transmission to the base station.

28. A method performed by a base station for instructing a wireless device how to perform cell measurements, the method comprising:
    a. transmitting a first control message to the wireless device instructing the wireless device to transition from a first mode of operation to a second mode of operation, wherein the control message comprises information relating to at least one first cell measurement parameter for use by the wireless device in performing cell measurements whilst in the second mode of operation.

29. The method as in embodiment 28 wherein the at least one first measurement parameter comprises at least one first cell quality derivation parameter for use in deriving cell quality based on beamformed reference signals.

30. The method as in embodiment 29 wherein the beamformed reference signals comprise one or more of synchronization signal blocks, SSB, Physical Broadcast Channel, PBCH, blocks and Chanel Status Information Reference Signals, CSI-RS.

31. The method as in embodiment 29 to 30 wherein the first mode of operation is associated with a first level of signaling overhead and the second mode of operation is associated with a second level of signaling overhead which is less that the first level of signaling overhead.

32. The method as in embodiment 29 or 30 wherein T the first mode of operation is optimized for uplink and downlink data transmission and the second mode of operation is optimized to minimize power consumption of the wireless device.

33. The method as in embodiments 31 or 32 wherein the first mode of operation comprises a Radio Resource Control connected mode of operation.
34. The method as in embodiment 33 wherein the second mode of operation comprises an RRC idle or an RRC inactive mode of operation.
35. The method as in embodiment 29 to 34 further comprising broadcasting system information comprising at least one second CQD parameter.
36. The method as in embodiment 35 wherein the first control message further comprising a timer associated with the at least one first CQD parameter.
37. The method as in embodiment 35 to 36 wherein the first control message comprising a cell list indicating in which cells the at least one first CQD parameter may be used.
38. The method as in embodiment 35 to 37 wherein the first control message comprising a predefined number of cell re-selections that the wireless device may perform using the at least one first COD parameter.
39. The method as in embodiments 35 to 38 further comprising broadcasting an indication instructing the wireless device to substitute using a subset of the at least one first CQD parameters for an equivalent subset of the at least one second CQD parameters.
40. The method as in embodiments 29 to 29 wherein the at least one first CQD comprising one or more of: an indication of a maximum number of beams to be averaged when performing CQD; an indication of a threshold quality for beams to be used to estimate cell quality; an indication of a resource type to be used to determine cell quality; a synchronization signal block configuration; and a channel state information reference signal, CSI-RS, configuration.
41. The method as in embodiments 29 to 30 wherein cell quality comprises one of more of: a reference signal received power, RSRP, a reference signal received quality RSRQ and/or a signal-to-interference-plus-noise ratio, SINR.
42. The method of any of the previous embodiments, further comprising:
obtaining user data; and
forwarding the user data to a host computer or a wireless device.

Group C Embodiments

43. A wireless device for performing cell measurements, the wireless device comprising:
processing circuitry configured to perform any of the steps of any of the Group A embodiments; and
power supply circuitry configured to supply power to the wireless device.
44. A base station for instructing a wireless device how to perform cell measurements, the base station comprising:
processing circuitry configured to perform any of the steps of any of the Group B embodiments;
power supply circuitry configured to supply power to the base station.
45. A user equipment (UE) for performing cell measurements, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments:
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
46. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.
47. The communication system of the previous embodiment further including the base station.
48. The communication system of the previous 2 embodiments, further including the UE, wherein the UE is configured to communicate with the base station.
49. The communication system of the previous 3 embodiments, wherein:
the processing circuitry of the host computer is configured to execute a host application, thereby providing the user data; and
the UE comprises processing circuitry configured to execute a client application associated with the host application.
50. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.
51. The method of the previous embodiment, further comprising, at the base station, transmitting the user data.
52. The method of the previous 2 embodiments, wherein the user data is provided at the host computer by executing a host application, the method further comprising, at the UE, executing a client application associated with the host application.
53. A user equipment (UE) configured to communicate with a base station, the UE comprising a radio interface and processing circuitry configured to performs the of the previous 3 embodiments.
54. A communication system including a host computer comprising:
processing circuitry configured to provide user data; and a communication interface configured to forward user data to a cellular network for transmission to a user equipment (UE),
wherein the UE comprises a radio interface and processing circuitry, the UE's components configured to perform any of the steps of any of the Group A embodiments.

55. The communication system of the previous embodiment, wherein the cellular network further includes a base station configured to communicate with the UE.

56. The communication system of the previous 2 embodiments, wherein:
the processing circuitry of the host computer is configured to execute a host application, thereby providing the user data; and
the UE's processing circuitry is configured to execute a client application associated with the host application.

57. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

58. The method of the previous embodiment, further comprising at the UE, receiving the user data from the base station.

59. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

60. The communication system of the previous embodiment, further including the UE.

61. The communication system of the previous 2 embodiments, further including the base station, wherein the base station comprises a radio interface configured to communicate with the UE and a communication interface configured to forward to the host computer the user data carried by a transmission from the UE to the base station.

62. The communication system of the previous 3 embodiments, wherein:
the processing circuitry of the host computer is configured to execute a host application; and
the UE's processing circuitry is configured to execute a client application associated with the host application, thereby providing the user data.

63. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

64. A method implemented in a communication system including a host computer, a base station and a user equipment (UE), the method comprising:
at the host computer, receiving user data transmitted to the base station from the UE, wherein the UE performs any of the steps of any of the Group A embodiments.

65. The method of the previous embodiment, further comprising, at the UE, providing the user data to the base station.

66. The method of the previous 2 embodiments, further comprising:
at the UE, executing a client application, thereby providing the user data to be transmitted; and
at the host computer, executing a host application associated with the client application.

67. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

68. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

69. The communication system of the previous embodiment further including the base station.

70. The communication system of the previous 2 embodiments, further including the UE, wherein the UE is configured to communicate with the base station.

71. The communication system of the previous 3 embodiments, wherein:
the processing circuitry of the host computer is configured to execute a host application;
the UE is configured to execute a client application associated with the host application, thereby providing the user data to be received by the host computer.

72. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

73. The method of the previous embodiment, further comprising at the base station, receiving the user data from the UE.

74. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1× Radio Transmission Technology
3GPP 3rd Generation Partnership Project 5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for performing a cell measurement, the method comprising:
receiving a first control message from a first base station instructing the wireless device to transition from a first mode of operation to a second mode of operation while the wireless device is being served by a first cell; and
responsive to the first control message comprising information relating to at least one first cell measurement parameter, performing a cell measurement according to the at least one first cell measurement parameter, wherein the at least one first cell measurement parameter comprises at least one first cell quality derivation (CQD) parameter for use in determining cell quality based on beamformed reference signals, wherein the at least one first CQD parameter is received via dedicated signaling;

receiving broadcast system information comprising at least one second CQD parameter; and, responsive to receiving a broadcast indication instructing the wireless device to substitute using a subset of the at least one first CQD parameters with using an equivalent subset of the at least one second CQD parameters, determining cell quality based on the equivalent subset of the at least one second CQD parameters, responsive to the wireless device performing cell reselection to a cell different from the first cell in which cell reselection rules are associated with a resource type which is not configured in the at least one first CQD parameter, determining cell quality according to the at least one second CQD parameter.

2. The method of claim 1, wherein the first mode of operation is associated with a first level of signaling overhead and the second mode of operation is associated with a second level of signaling overhead that is less that the first level of signaling overhead.

3. The method of claim 1, wherein the first mode of operation is optimized for uplink and downlink data transmission and the second mode of operation is optimized to minimize power consumption of the wireless device.

4. The method of claim 1, wherein the first mode of operation comprises a Radio Resource Control (RRC) connected mode of operation, and, wherein the second mode of operation comprises an RRC idle or an RRC inactive mode of operation.

5. The method of claim 1, wherein the at least one first CQD parameter may be associated with one or more frequencies, one or more cells, or one or more frequencies each associated with one or more cells.

6. The method of claim 1, wherein the cell measurement comprises determining a cell quality of one or more cells from which the wireless device is receiving the beamformed reference signals.

7. The method of claim 1, further comprising, responsive to the first control message comprising a timer associated with the at least one first CQD parameter:
starting the timer upon receipt of the first control message;
determining cell quality according to the at least one first CQD parameter until the timer expires; and
determining cell quality according to the at least one second CQD parameter after the timer has expired.

8. The method of claim 1, wherein the at least one first CQD parameter comprises a channel state information reference signal (CSI-RS) configuration, the method further comprising:
responsive to the wireless device handing over to a second base station that indicates that CSI-RS configurations are not used to perform cell re-selection, determining cell quality based on the at least one second CQD parameter.

9. The method of claim 1, wherein the at least one first CQD parameter comprises a synchronization signal block (SSB) configuration, the method further comprising:
responsive to the wireless device handing over to a second base station which indicates that SSB configurations are not used to perform cell re-selection, determining cell quality based on the at least second CQD parameter.

10. The method of claim 1, further comprising, responsive to receiving a second control message instructing the wireless device to transition from the second mode of operation back to the first mode of operation, determining cell quality according to at least one third CQD parameter received during the first mode of operation or a pre-defined default rule indicating how to determine cell quality when the UE enters the first mode of operation.

11. The method of claim 1, wherein the at least one first CQD parameter comprises one or more of: an indication of a maximum number of beams to be averaged when performing CQD; an indication of a threshold quality for beams to be used to estimate cell quality; an indication of a resource type to be used to determine cell quality; a synchronization signal block configuration; and a channel state information reference signal (CSI-RS) configuration.

12. The method of claim 1, wherein the first control message is received while the wireless device is located within a first radio access network notification area (RNA), the method further comprising:
responsive to the wireless device moving from the first RNA to a second RNA, determining cell quality according to the at least one second CQD parameter.

13. The method of claim 1, further comprising:
responsive to the wireless device performing a predefined number of cell re-selections, determining cell quality according to the at least one second CQD parameter.

14. The method of claim 13, wherein the first control message comprises information relating to the predefined number of cell re-selections.

15. The method of claim 1, wherein the first control message is received while the wireless device is being served by a first cell, the method further comprising:
responsive to the wireless device handing over from the first cell to a second cell, wherein the second cell is not a cell on a predetermined cell list, determining cell quality according to the at least one second CQD parameter.

16. The method of claim 15, wherein the first control message comprises information relating to the predetermined cell list.

17. A wireless device for performing a cell measurement, the wireless device comprising processing circuitry configured to:
receive a first control message from a first base station instructing the wireless device to transition from a first mode of operation to a second mode of operation while the wireless device is being served by a first cell; and
responsive to the control message comprising information relating to at least one first cell measurement parameter, perform a cell measurement according to the at least one first cell measurement parameter, wherein the at least one first cell measurement parameter comprises at least one first cell quality derivation (CQD) parameter for use in determining cell quality based on beamformed reference signals, wherein the at least one first CQD parameter is received via dedicated signaling;
receive broadcast system information comprising at least one second CQD parameter; and,
responsive to receiving a broadcast indication instructing the wireless device to substitute using a subset of the at least one first CQD parameters with using an equivalent subset of the at least one second CQD parameters, determining cell quality based on the equivalent subset of the at least one second CQD parameters,
responsive to the wireless device performing cell reselection to a cell different from the first cell in which cell reselection rules are associated with a resource type which is not configured in the at least one first CQD parameter, determining cell quality according to the at least one second CQD parameter.

* * * * *